United States Patent [19]
Flavin et al.

[11] Patent Number: 6,108,308
[45] Date of Patent: Aug. 22, 2000

[54] SYSTEM AND METHOD FOR DYNAMIC VIDEO ROUTING

[75] Inventors: Robert Alan Flavin, Yorktown Heights; Perwaiz Nihal, Fishkill, both of N.Y.; Geoffrey Hale Purdy, Roxbury, Conn.; Norbert George Vogl, Mahopac, N.Y.

[73] Assignee: International Business Machines Corporation, Armonk, N.Y.

[21] Appl. No.: 08/715,214

[22] Filed: Sep. 17, 1996

[51] Int. Cl.[7] .............................. H04L 12/56; G06F 13/00
[52] U.S. Cl. .......................... 370/238; 370/255; 370/351; 370/395; 709/238
[58] Field of Search ..................................... 370/230, 235, 370/237, 238, 254, 255, 351, 395, 396, 400; 709/238, 241, 242, 243; 714/3, 4

[56] References Cited

U.S. PATENT DOCUMENTS

| 4,912,656 | 3/1990 | Cain et al. | 395/200.72 |
| 5,682,479 | 10/1997 | Newhall et al. | 395/200.72 |
| 5,721,819 | 2/1998 | Galles et al. | 395/200.73 |
| 5,781,537 | 7/1998 | Ramaswami et al. | 370/254 |

OTHER PUBLICATIONS

Data Structures and Algorithms by Aho et al., pp. 37–39, 50–53, 64–66, 203–212, Addison–Wesley, 1983.
Data Structures and Algorithms 2: Graph Algorithms and NP–Competeness by Mehlhorn, pp. 46–50, Springer–Verlag, 1984.

Primary Examiner—Alpus H. Hsu
Attorney, Agent, or Firm—Louis J. Percello

[57] ABSTRACT

One or more novel switch controllers are used in a network of network devices to connect and disconnect to one another. The switch can be any general purpose computer that has one or more communication links that connect one or more outputs of the computer to one or more of the network devices. In the computer, the network is represented by a directed graph that has two or more nodes and one or more directional edges connecting one or more pairs of the nodes. Each node in the pair represents a device that is connected/disconnected (represented by the edge of the directed graph.) One or more commands are associated with each edge that is used to connect the network devices represented by the nodes that the edge connects. When connecting the connected source to the connected sink, the computer executes a routing process that searches the directed graph to find the nodes associated with both the connected source and the connected sink and a path between the connected source and the connected sink through the directed graph (network). The computer executes a connection process that traverses the path and performs each command associated with each of the edges along the path so that the network devices operate to form a connection between the connected source and the connected sink along the path.

29 Claims, 23 Drawing Sheets

FIG.3A

SOURCE/SINK RECORD 225

| SOURCE/SINK RECORD NAME 232 | SOURCE/SINK RECORD TITLE 234 | SINK FROM 1 (OPTIONAL) 230 | ... | SINK FROM p (OPTIONAL) 230 | SOURCE TO 1 (OPTIONAL) 250 | ... | SOURCE TO ∞ (OPTIONAL) 250 |

FIG.3B

GROUP RECORD 280

| GROUP NAME 282 | GROUP TITLE 284 | GROUP FLAG 286 |

FIG. 18

| TABLE NAME | 205 |
| TABLE TITLE | 210 |

| SOURCE/SINK RECORD NAME | 232 | CAMERA | 225 |

| S/S RECORD NAME | 232 | ABC | COMBINER 360 | ECHO 7 365 | 230 225 |
| S/S RECORD NAME | 232 | CBS | COMBINER 360 | ECHO 2 365 | 230 225 |
| S/S RECORD NAME | 232 | VCR | CAMERA 310 | SELECT VIDEO 1 315 | 250 |
|  |  |  | TUNER-A 310 | SELECT VIDEO 2 315 | 250 225 |
| S/S RECORD NAME | 232 | TUNER-B | COMBINER 310 | TUNE B 315 | 250 225 |

1800

SYSTEM AND METHOD FOR DYNAMIC VIDEO ROUTING

FIELD OF THE INVENTION

This invention relates to the field of switching and routing communications systems. More specifically, the invention relates to switching and routing audio, video, and computer data signals among multiple computer devices, baseband audio and video devices, analog and digital fiber optic devices, and radio frequency (RF) devices.

BACKGROUND OF THE INVENTION

Cable systems, e.g. cable systems used for Cable TV (CATV), are one prevalent and effective way of communicating information. A cable system can be broadly divided into three parts: source generation; combination; and distribution. Source generation consists of creating streams of audio, video, and computer data from different types of media. For example, the data streams (or data) can be read from a video tape player (VTR), laser disc, or computer hard drive. Data may also be transmitted to the cable system from cameras in a television studio, satellites, fiber optics, the cable system itself, or through the air and received via antennas.

In the combination part, the cable system uses a series of modulators and combiners to bring the streams of audio, video, and computer data, onto a common carrier: the coaxial cable. A modulator takes a data signal (e.g., audio, video, and/or computer/digital) and modulates it into a 6 MHz frequency slot. The combiners combine the output of the modulators together. By carefully allocating the frequency spectrum, the interference of each modulated signal can be minimized. The modulation and combination matrix within these systems can become complex. Each building which contains a combination system is called a "head-end".

The combination of frequency slots, and the data within the slots, defines the channel lineup for the cable system. A channel lineup is a list of the channels, e.g. the signal frequencies, and the program, e.g. the TV shows, that the cable company offers to its customers. A single cable system will often serve several different areas within a town or county and provide each area with slightly different channel lineups. For example, a Spanish language channel lineup might be broadcast to one geographic area with a large Spanish speaking population, while other programs (i.e., in English) would be transmitted to other locations. As another example, meetings in town halls would be transmitted only to the customers within the respective town in which the town hall is located.

Once the audio, video, and computer data channels have been modulated and combined together, the resulting frequency spectrum is distributed to the cable systems subscribers other the distribution part of the cable system. Distribution is done through a tree and branch system of fiber optics and coaxial cable. The cable system will translate the cable frequencies into optical frequencies and transmit the data over fiber optic cables through a series of fiber optic filters, spitters, and repeaters. The use of fiber optics allows the cable system to transmit its signal over long distances with little loss or outside interference. Wherever the fiber passes pockets of subscribers homes, translators are put in place to translate the fiber frequencies back to the cable spectrum. The data then travels over coaxial cable through cable amplifiers and splitters into each subscribers home (drop). Amplifiers in the distribution system have bidirectional capability. Just as signals are modulated at the cable system head-end and broadcast to the homes, signals may also be modulated onto assigned frequency slots at a customer drop and transmitted back to head-ends.

Cable companies are trying to connect one location to another with a cable link without running a dedicated link. In order to do this, connections are manual connected and disconnected at the head end.

Cable systems have several ways to connect data sources to modulators. The majority of video channels in a cable system will typically be received from a satellite and be connected directly into modulators. A satellite dish will receive all of the data channels being broadcast on a particular satellite. These data channels will be sent to satellite receivers and descramblers which convert the satellite data to baseband audio and video. The resulting baseband audio and video will then be sent to dedicated modulators.

Cable systems also receive and distribute locally originated video. This video typically comes from video tapes or is received live from a television studio. The video can consist of news broadcasts, local commercials, or public events such as town hall meetings or sports games. This video does not generate as much revenue for the cable system and several video sources will often share the same modulator. The video sources can be either connected to the modulators manually by plugging and unplugging wires; through a cross-point switch; or through other relays. The cross-point switches and relays may be controlled manually by push-buttons, through timers, or through RS-232 connections to computers and computer terminals.

STATEMENT OF PROBLEMS WITH THE PRIOR ART

With the advent of better quality equipment and the popularity of cable, cable systems have grown to become large and complex. They can no longer place an antenna on a mountain and distribute only to the homes in the immediate area below. Todays cable systems must deal with over one hundred permanent and temporary data sources. Cable systems have grown beyond simple direct connections to a handful of modulators and amplifiers.

Currently, cable systems have difficulty in reordering their lineup. Lineups are changed by changing the connection between a video source and its modulator/combiner. This is done manually or by a locally programmed switch. The knowledge of how the system operates, i.e., to reorder lineups, is limited to a few select engineers who are vital to the system. If an engineer leaves the company, permanently or temporarily, e.g. for sick leave, then the system cannot be easily modified until someone else can learn enough to take the engineer's place. Further, in complex connections such as these, it is difficult to determine what the optimal connections are in terms of cost and/or quality.

Cable systems operate on low budgets and have both old and new equipment from many different manufacturers mixed together. The equipment (switches, modulators, amplifiers) have different interfaces and characteristics from each other. This increases the learning curve to train a new engineer and increases the risk that any engineer may make a mistake.

Lineup changes are difficult to make. Lineup changes can conflict with local tariffs and local, state, and federal laws place restrictions on frequency allocation. Because the system operates 24 hours per day, any the switching must be made while the system is in operation and might cause service on other channels to be interrupted. Contractual obligations, specifically in the case of commercial insertion, with content providers may require that data sources be switched only at certain times. And, when a cable system is serving several communities each with different channel lineups the combination system can become complicated and misleading to someone without a full understanding of the overall design. These risks to system integrity make station managers reluctant to change lineups. Therefore, a cable system can not easily incorporate new video sources and change existing ones. These limitations further place dependence for the cable system on its key engineers.

OBJECTS OF THE INVENTION

An object of this invention is an improved system and method that routes video communications from one or more sources to one or more destinations (sinks).

An object of this invention is an improved system and method that routes video communications from one or more sources through one or more network devices to one or more destinations (sinks).

An object of this invention is an improved system and method that routes video communications among one or more devices on a video, computer, and/or RF communications network.

An object of this invention is an improved system and method that routes video communications among one or more devices on a video, computer, and/or RF communications network that is capable of being reconfigured.

SUMMARY OF THE INVENTION

One or more novel switch controllers are used in a network of devices, generally called network devices, to connect and disconnect to one another. The (network) devices include one or more signal source devices, one or more signal sink devices and one or more other network devices. The network devices can be any hardware that is capable of generating, receiving, transmitting, and/or processing a communication signal including commands and/or data/information. (In one preferred application, the network is used to connect devices that convey video and and/or audio information over radio frequency networks, e.g. broadcast television networks and cable television network.) The signal source devices generate the communication signals and are called connected sources if the switch connects/disconnects or is to connect/disconnect them through the network to a signal sink device, called a connected sink. Signal sink devices receive and/or process/display the communication signal.

The switch can be any general purpose computer that has one or more communication links that connect one or more outputs of the computer to one or more of the network devices. In the computer, the network is represented by a directed graph that has two or more nodes and one or more directional edges connecting one or more pairs of the nodes. Each node in the pair represents a device that is connected/disconnected (represented by the edge.) (Note that in this disclosure, "connection" will be used to denote connection or disconnection without loss of generality.) Since the network is represented as a directed graph, the edge/connection has a direction from one of the network devices called a From Device to the other network device in the pair called a To Device and therefore, each of the edges represents a connection directed from the From Device to the To Device.

Further, one or more commands are associated with each edge. Each of the commands define an operation that the To Device performs to establish a connection between the From Device and the To Device.

When connecting the connected source to the connected sink, the computer executes a routing process that searches the directed graph to find the nodes associated with both the connected source and the connected sink. The routing process determines a path between the connected source and the connected sink through the directed graph (network) that includes two or more of the directed graph nodes associated with the network devices necessary to make the physical connection between the connected source and the connected sink. The path contains the one or more edges that connect the pairs of nodes along the path. Path optimization techniques can be used to determine paths of minimum cost.

The computer executes a connection process that traverses the path and performs each command associated with each of the edges along the path so that the respective To Devices operate to form a connection between the connected source and the connected sink. In this way, the physical connection between the connected source and sink is made.

The directed graph is defined using novel data structures that enable a user to add/ delete any network device and/or connection to those devices by merely changing records in the data structures. No redesign or reconfiguration of the system is necessary.

BRIEF DESCRIPTION OF THE DRAWINGS

FIG. 3 is four block diagrams: FIG. 3A a block diagram of a Source/Sink Video From field; FIG. 3B a block diagram of a Group Record.

FIG. 18 is a block diagram of a non limiting example table set used in the system described in FIG. 10.

DETAILED DESCRIPTION OF THE INVENTION

Figure 1:
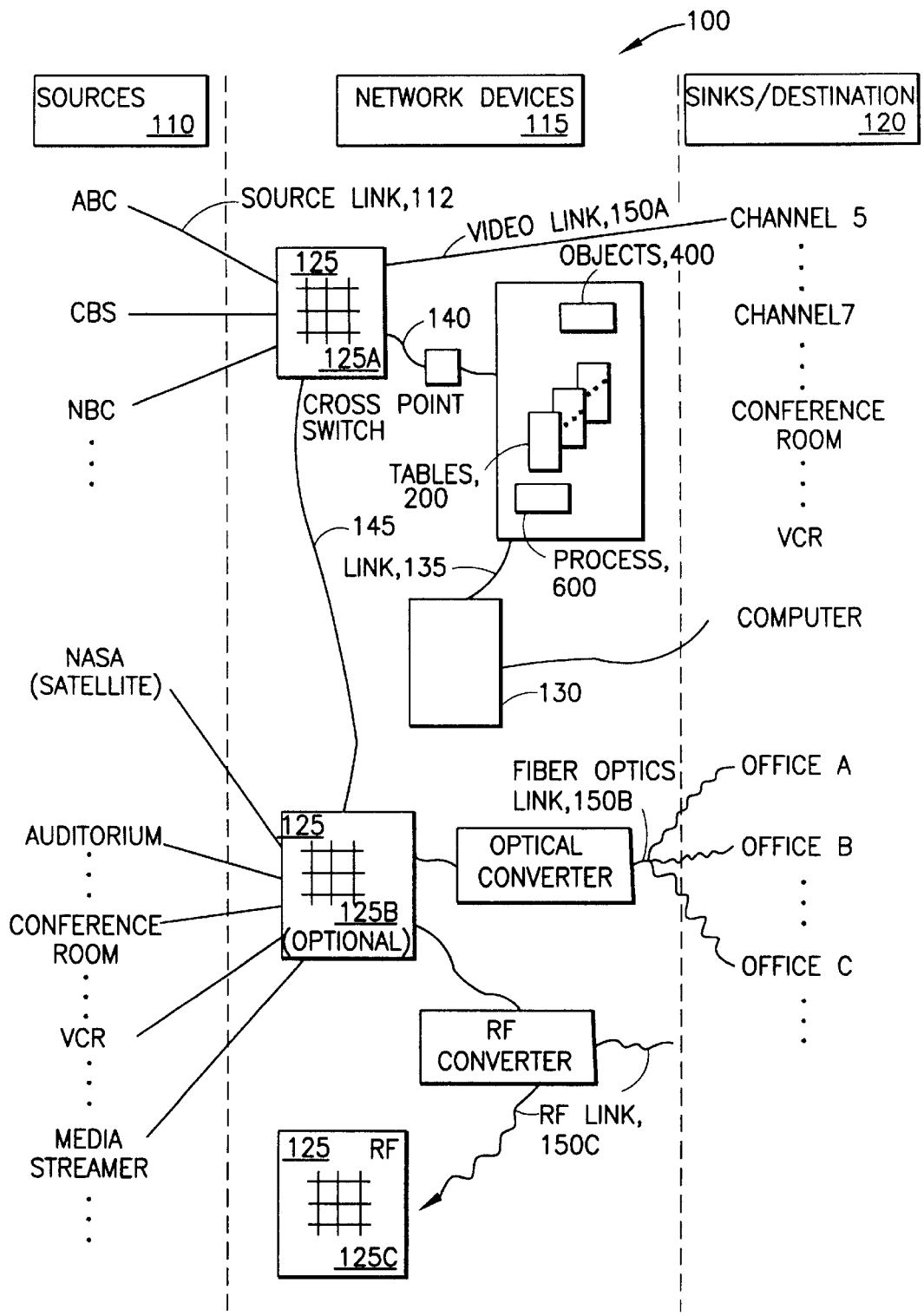
FIG. 1 is a block diagram a preferred hardware and software model of the present invention.

FIG. 1 is a block diagram of the general hardware and software model 100 of our invention. Block 110 shows some preferred signal sources. Block 120 shows some preferred signal sinks. Block 115 shows a variety of devices which connect the sources (110) to the sinks (120).

The sources listed in column 110 generate video, audio, or computer data signals. These could be broadcast television channels received from a terrestrial antenna such as might be used by a television network/station like ABC, CBS, NBC, and FOX. They could be broadcast television channels received from a satellite dish/link such as the NASA Select channel. They may be prerecorded audio and video stored on video tapes or in a computer. Or they may be locally originated signals from cameras and studios. Signal sources 110 are well known and can take the form of these and other embodiments. Other examples include: a video cassette recorder, a laser disc play, a microphone, a media streamer, a telephone, and a camera.

The sinks 120 are devices which receive and possibly display the video, audio, or computer data signals. They might be television monitors, television sets, or computer workstations in homes, offices and/or conference rooms. They may be VCRs or digitizers in studios, or they may be modulators which distribute the signal to a large community of homes. Signal sinks 120 are well known and can be embodied in these and other ways. Other examples include: a television station, a video cassette recorder, a television monitor, other general purpose computers, and a media streamer.

The network devices 115 establish connections and provide the transport of the signals from the sources 110 to the sinks 120. The most frequently used devices 115 are crosspoint switches (125). These switches 125 can connect one or more of the sources 110 to one or more of the sinks 120. Crosspoint switches 125 are available for many different types of media and signal bandwidth. Note that an output of one cross point switch 125B can be connected to the input of one or more other cross point switched 125A and/or other network device 115 to enable different switching configurations. For example, cross point switch 125B may be located and controlled in a different location that cross point switch 125A. Device 125A is a crosspoint switch for baseband audio and video signals. Device 125B is an optical crosspoint switch. Device 125C is an RF crosspoint switch (50 MHz–1 GHz). These cross point switches (125A,B,C) and their connections are well known. Other network devices 115 include: a radio frequency cross point switch, a radio frequency converter, an optical converter, a radio frequency combiner, a radio frequency splitter, a fiber optics link, a radio frequency link, a modulator, a demodulator, a base band video link, a telephone, a computer network server, a computer network router, and a computer.

Several types of physical connections are used to connect the various network devices 115 to the sources 110, other network devices 115, and the to sinks 120. For example, 150A and 140 are cables carrying baseband audio/video signals; 150C is a cable carrying RF signals; 135 is a cable carrying digital signals between computers. These connectors are well known.

Other network devices 115, called interface devices, are used to make one form of signal used by one network device 115 compatible with another form of signal used by another network device 115. Some of these interface devices include: a digitizer, which digitizes analog audio and video into a digital signal; a broadband optical receiver that converts optical signals on a fiber to RF signals on a coaxial cable; a broadband optical transmitter that converts RF signals on a coaxial cable into optical signals on a fiber; a baseband optical transmitter that converts baseband signals on a coaxial cable to optical signals on a fiber; and a baseband optical receiver that converts baseband optical signals on fibers to baseband signals on a coaxial cable.

The present invention novelly uses one or more computers 130, with one or more memories and one or more central processing units (CPUs), used as a switch controller to route digital/analog signals between sources 110 and sinks 120 by controlling the network devices 115, e.g. crosspoint switches 125. Each of the computers 130 has a Table Set 215 and a Network Node Set 435. The table set 215 models each of the sources 110 and sinks 120. The Network Node Set 435 models the network devices 115, provides instructions about how to operate each of the respective network devices 115, and provides information to establish connections among each of the the network devices 115, sources 110, and sinks 120. Table sets 215 are described in FIG. 2. Network Node Sets 435 are described in FIG. 4.

The computer 130 is connected to one or more the network devices 115. The computer 130 has data structures shown in FIG. 2 through 5 that describe the network 100 as a directed graph. The directed graph has more nodes that represent the devices (source 110, sink 120, and network 115) of the network 100 and one or more directional edges connecting one or more pairs of the nodes. Each node in the pair of nodes represents either devices that are "a From Device" and "a To Device", and each of the edges representing a connection directed from the From Device to the To Device. The computer 130 also has one or more commands (see FIG. 5) that are associated with each edge. Each of the commands define an operation to be performed by one the devices in the pair, e.g. the To Device, to establish a connection between the From Device and the To Device in the pair of nodes. A series of these commands are executed by the computer 130 along a path determined by a path finding process shown in FIG. 11. An example of a network shown as a directed graph is given in FIG. 10.

Figure 6:
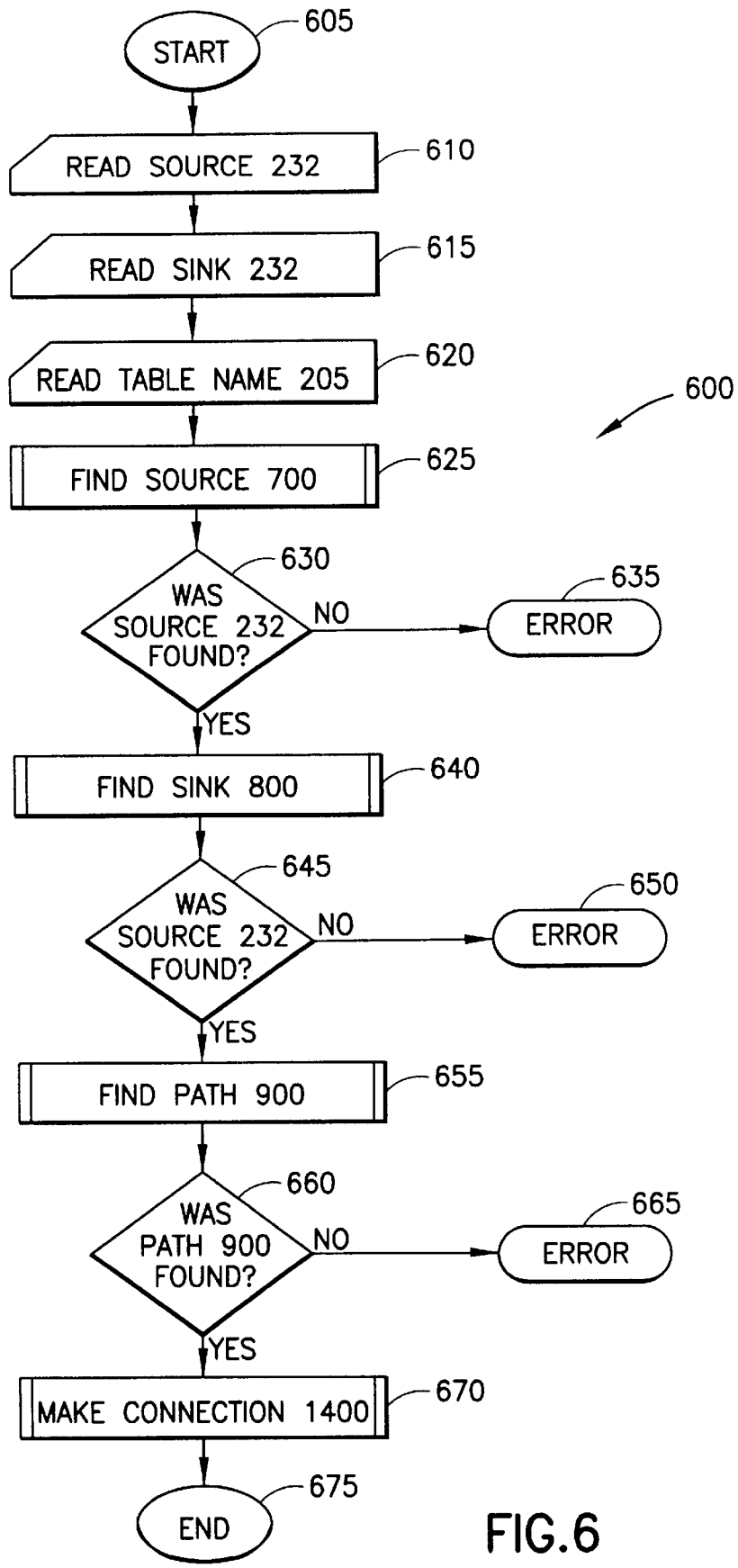
FIG. 6 is a flow chart showing the steps of a routing process.

Each of the computers 130 executes a process 600 to determine a path and establish the connection between (connected) sources 110 and (connected) sinks 120 by operating the network devices (including interface devices) used to establish the connection. FIG. 6 describes the process 600. In alternative preferred embodiments, one computer 130 can determine the path (FIG. 11) and as the path is traversed, other computers (identified in field 420 below) can execute the commands that establish the connection between the connected source and connected sink.

Figure 2:
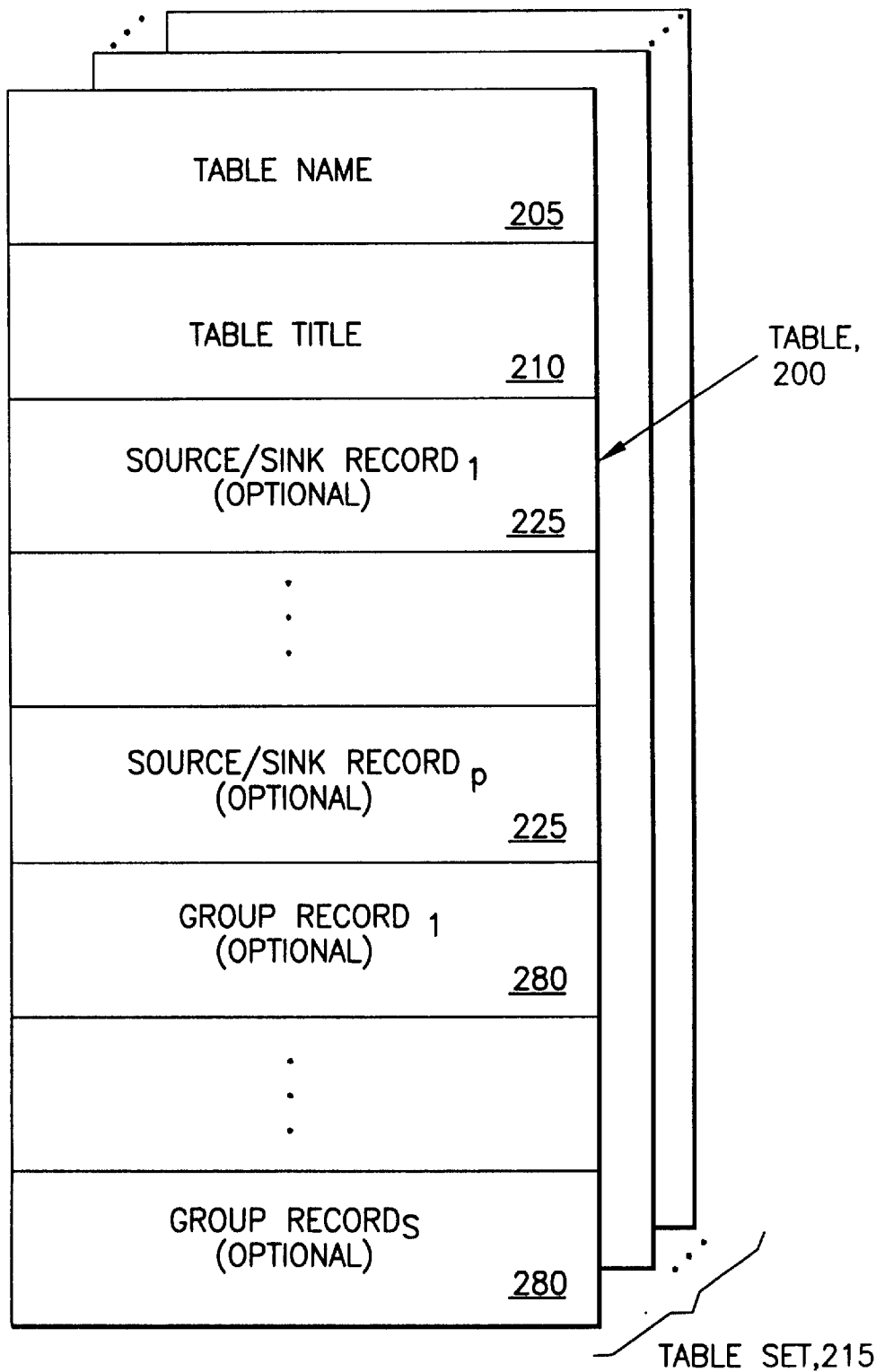
FIG. 2 is a block diagram of the structure of a given source/sink table.

FIG. 2 is a block diagram of a set of Source/Sink table 200, i.e., the table set 215. Each table 200 lists the originations and destinations (sources 110 and sinks 120) of audio, video, and/or computer data signals. Each Source/Sink table 200 has a Source Sink Name 205, an optional Source Sink Title 210, zero or more Source/Sink records 225, and zero or more Group Records 280. The Source/Sink Name 205 is a unique identifier which distinguishes a given Source/Sink table 200 from other tables in the table set 215. For example, the name of the Source/Sink Table 200 which lists all broadcast television channels might be BCH. The Source/

Sink Title 210 is an optional text description which describes the contents of the Source/Sink Table 200. The title 210 of the BCH table, for example, might be "Broadcast Television Channels".

Each of the sources 110 and sinks 120 of a Source/Sink Table 200 are individually listed within Source/Sink Records 225. These records 225 are described in detail in FIG. 3.

None, some, or all of the sources 110 and/or sinks 120 in the model 100 can be listed in any order in a given Source/Sink table 200. For example, the BCH table which lists broadcast television channels may have Source/Sink Records 225 only for sources 110 such as the major networks such as ABC, CBS, FOX, and NBC and no Source/Sink Records 225 for sinks 120. Alternatively, a table 200 describing offices and conference rooms in a building might have many Source/Sink records 225 describing sinks 120, e.g., one for each office. The table 200 may also have a few Source/Sink records 225 which identify a device as both a source 110 and a sink 120, e.g. a record for a conference room that has both sources and sinks.

Group records 280 can optionally be included in a Source/Sink Table 200. A Group Record 280 has one or more Table Names 205. Therefore, the Source/Sink Tables 200 that have Table Names 205 in a given Group Record 280 are grouped together. Group Records 280 provide a way to categorize and/or access Source/Sink Tables 200 with common attributes. Therefore, smaller numbers of Source/Sink Records 225 can be accessed. For example, by grouping all the sources 110 and sinks 120 on a first floor of a building in one group, modification of the Source/Sink Records 225 can be made on the first floor without accessing Source/Sink Records 225 of other floors of the building. Using Group Records 280 in this way permits a efficient addition and/or deletions of the sources 110 and sinks 120 of the system 100, i.e., the system 100 becomes more scalable.

Group Records 280 also provide a convenient way to establish a hierarchy of Source/Sink Tables 200, e.g., by placing a Group Record 280 containing the Table Names 205 of a subset of Source/Sink Tables 200 in a Source/Sink Table in a superset. Note that sources 110 and/or sinks 120 of the model 100 can be added (or deleted) from the model 100 by adding (deleting) a Source/Sink Record 125 from the appropriate Source/Sink Table 200. By using Group Records 280, these changes do no effect the organization of the system 100.

A cable system will have a large number of both sources 110 and sinks 120. To make the management of these easier, the records optionally may be divided into groups. The Group Records 280 of a Source/Sink Table 200 indicate which other Source/Sink Tables 200 contain related Source/Sink Records 225 about sources 110 and/or sinks 120. These records 280 are described in detail in FIG. 3.

In one preferred implementation, the Source/Sink Tables 200 are grouped by location. All sources and sinks that are in a common building are grouped together. The Source/Sink Records 225 for sources 110 and/or sinks 120 for larger buildings can be further grouped by content. For example, in one implementation a Source/Sink Table 200 lists all the offices of a first building, another Source/Sink Table 200 lists the television channels available over the satellite dish in the first building, and a third Source/Sink Table 200 lists both the sources and sinks of a second building that often has established connection with source/sinks of the first building. A master Source/Sink Table 200 contains no Source/Sink Records 225 but only Group Records 280 which reference all the Source/Sink Tables 225 defining this system 100.

FIG. 3A is a block diagram of a typical Source/Sink Record 225 that describes one origination or destination of an audio, video, and/or computer data signal. The originations can be any source 110, including: television stations, channels from a satellite dish, cameras in studios, or multimedia computers. Sinks 120 can include: computers, television modulators, monitors, VCRs, or offices. The Source/Sink Record contains a Source/Sink Record Name 232, Source/Sink Record Title 234, and one or more instructions indicating where the signal is sent to 250, where it is received from 230, and how a connection to the source 110/sink 120 can be made. The Source/Sink Record Name 232 identifies the source and/or sink. This name 232 is a unique name for each of the sources 110 and sinks 120 devices listed in the Source/Sink Table 200 containing the Source/Sink Record 225. This Name 232 may or may not be unique in any of the other Source/Sink Tables 200. The Source/Sink Record Title 234 is an optional short text description of the source 110 and/or sink 120.

Each Source/Sink Record contains zero or more Source/Sink Video From fields 230 and zero or more Source/Sink Video To fields 250. The Source/Sink Video From fields 230 indicate where the source/sink receives a signal from and contains instructions on how the reception can be activated. The Source/Sink Video To fields 250 indicate where the source/sink sends its signal to and how the transmission can be activated. These fields are described in detail in FIGS. 3C and 3D, respectively.

FIG. 3B is a block diagram of a typical Group Record 280. This Group Record 280 points to another single Source/Sink Table 200. These Group Records 280 allow the sources 110 and sinks 120 to be managed in a hierarchical, scalable fashion, as described above. The Group Record 280 contains a Group Name 282, a Group Title 284, and a Group Flag 286. The Group Name 282 is the table name 205 of a Source/Sink Table 200. The Group Name should match exactly the table name 205 of an existing Source/Sink Table 200. The Group Title 284 is an optional text field which describes the table 200 being referenced. The Group Flag 286 is an optional field which is used to distinguish a Group Record 280 from a Source/Sink Record 225. In one implementation, the Group Flag field always contains the text "GROUP". Other ways can be envisioned to distinguish the Group Record 280 from the Source/Sink Records 225.

Figure 3C:
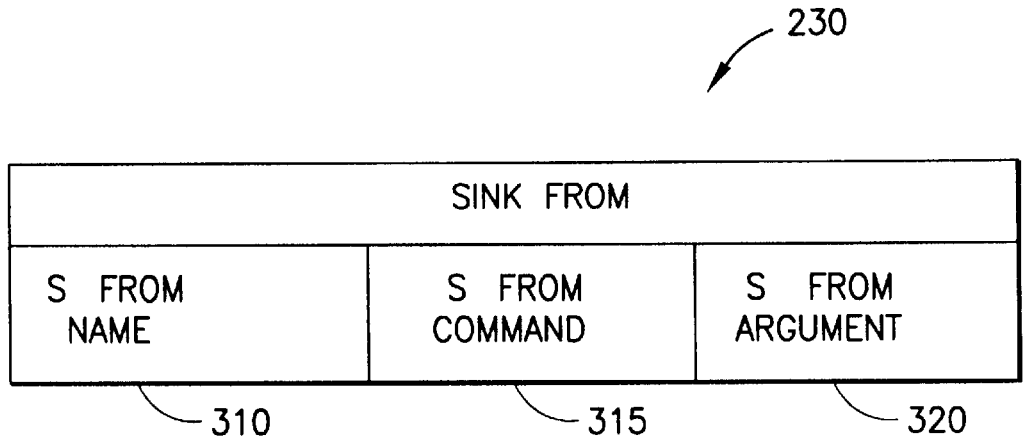
FIG. 3C a block diagram of a Source/Sink Sink From field.

FIG. 3C is a block diagram of a sink from field 230. Typically, the sink from field 230 contains instructions on how a signal (audio/video/computer) may be connected to a sink 120. The Sink From Name field 310 contains the name of a Network Node 400 that may send a signal to the sink 120. The Network Node 400 is a table residing on one of the computers 130. The Sink From Command field 315 contains the name of a command to that is executed by the computer 130 using the information in the Network Node 400 to initiate the signal. The optional Sink From Argument field 320 contains any arguments that should be passed to the command. This forms an edge in the directed graph, specifically from a network device 115 to a sink 120.

The three fields (Name 310, Command 315, Argument 320) specify where a source/sink receives a signal and how it can begin reception. For example, a Source/Sink record for an office might be filled in as follows:

| name: | 4-E06 |
|---|---|

-continued

| title: | 4-E06, John Doe |
| video from: | (BLDG4, SWITCH, 235) |

This shows that John Doe's office, 4-E06, receives video from the network device 115 described in Network Node 400, BLDG4. To send video to the office, the SWITCH command is run for the network device 115 described as BLDG4 with an argument of 235.

Figure 3D:
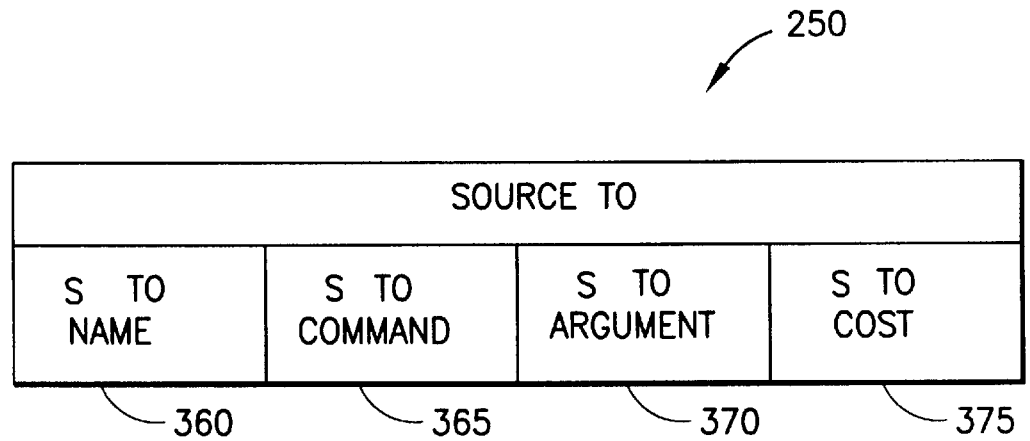
FIG. 3D a block diagram of a Source/Sink Source (Video) To field.

FIG. 3D is a block diagram of Source/Sink Video To field 250. The Source/Sink Video To field 250 contains instructions on how a source 110 transmits an audio, video, or computer data signal. The Source To Name field 360 contains the name of a Network Node 400 that may receive a signal from the source 110. The Source To Command field 365 contains the name of a command that the computer 130 executes using information in the Network Node 400 to initiate transmission of the signal. The optional Source To Argument field 370 contains any arguments that should be passed to the command. This forms an edge in the directed graph, specifically from a source 110 to a network device 115.

The three fields (Name 360, Command 365, Argument 370) specify where a source sends a signal and how it can begin transmission. For example, a Source/Sink Record 225 for an incoming broadcast television station might be filled in as follows:

| name: | ABC |
| title: | ABC, Channel 7 |
| source to: | (BLDG4, EMIT, 7) |
| source to: | (BLDG5, EMIT, 7) |

This shows that ABC comes into the BLDG4 and BLDG5 network devices 115 over channel 7. However, before those networks devices 115 can receive ABC, the EMIT command must be run with an argument of 7.

Figure 4:
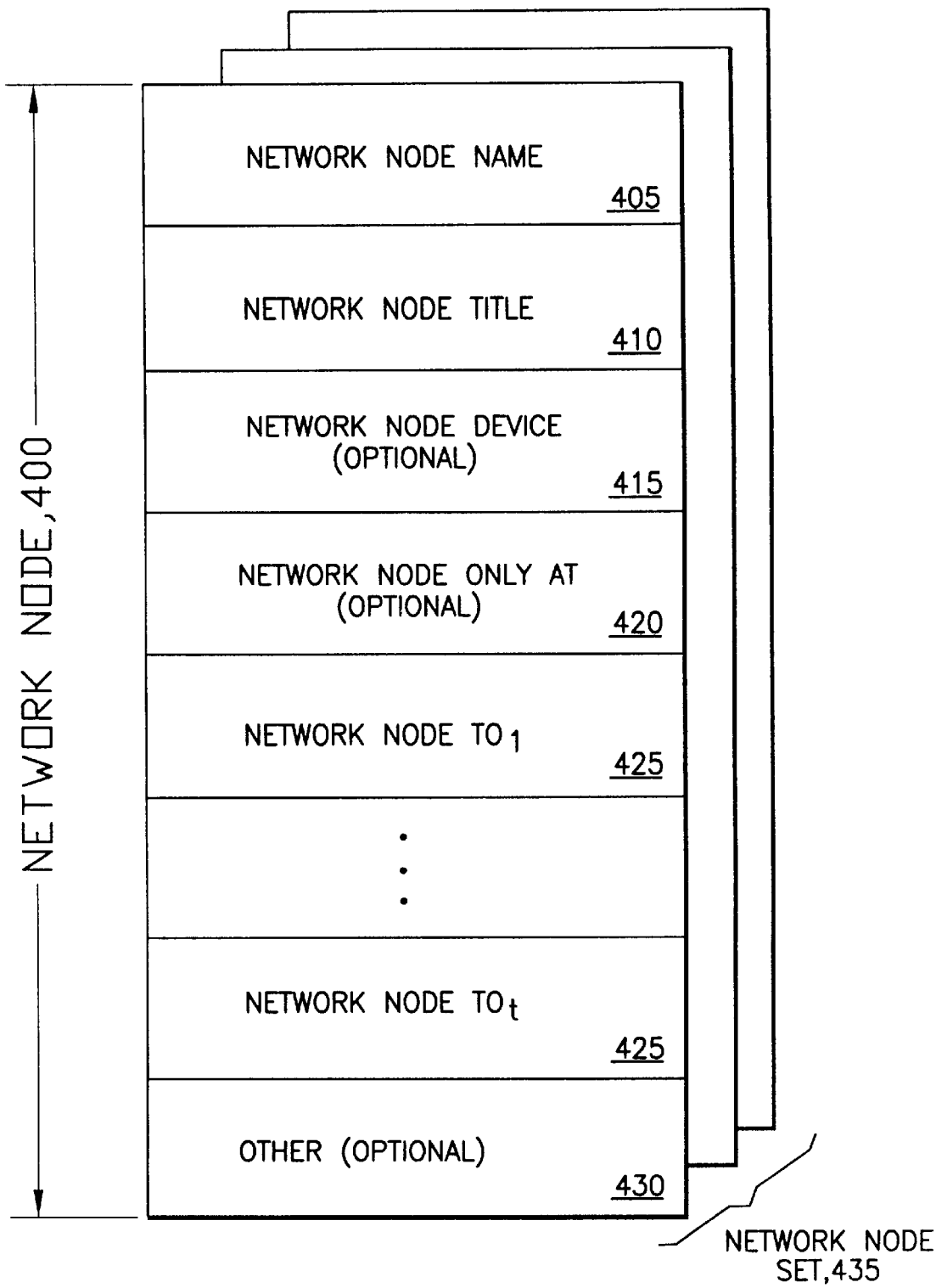
FIG. 4 is a block diagram of a network node set of network objects.

FIG. 4 is a block diagram of a set 435 of typical preferred Network Node tables 400. Each of the Network Node tables 400 describes the network devices 115 in the system 100 and the connections between the sources 110 and the sinks 120 of the system 100, e.g. a cable TV system 100. For an RF network, a network node might represent a trunk line 150C which RF modulators feed into and which branches throughout a building or neighborhood into homes and offices. A Network Node 400 may also represent a crosspoint switch 125 which has the capability of connecting any of its input to any of its outputs.

Each Network Node has a Node Name 405 and an optional Node Title 410. The Network Node Name 405 is a unique identifier used to distinguish the Network Node 400 from other Network Nodes 400 in the database. The Network Node Title 410 is a text description of the purpose of the Network Node 400. The Network Node Device field 415 is an optional field which can be used to indicate how a device (such as a crosspoint switch) is connected to a computer. This field could hold an RS-232 port number, with baud rates, bit rates, and other RS-232 specific details. It could also hold TCP/IP or SNMP port addresses. The Network Node Only At field 420 is an optional field which is used to indicate that the network device can be controlled only at a specific server. If present, the field should contain the address of the server (computer) which has sole control over the device.

The Network Node To fields 425 list where signals (audio, video, computer data) on the network node can be sent to and what commands should be run to initiate a connection. These fields are described in detail in FIG. 5 and define the edges between network devices 115 in the directed graph. The Network Node 400 may also contain other optional information 430 such as manufacturer or model number data.

Figure 5:
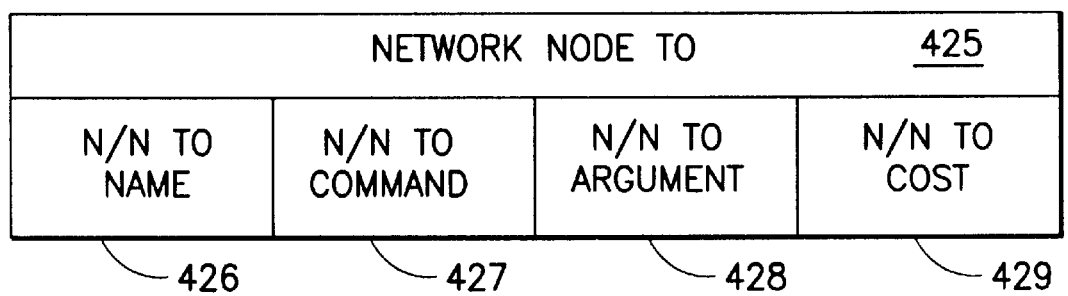
FIG. 5 is a block diagram of a "network node video to" record.

FIG. 5 is block diagram of a typical Network Node To 425 field. The Network Node To field 425 is nearly identical to the Source To Field 250. This field describes how audio, video, or computer data signals are transmitted from the network node to other network nodes. The Network Node To name field 426 contains the name of the network node which may receive the signal. The Network Node Command field 427 contains the name of a command to be run by the computer 130 using information in the the Network Node 400 in order to initiate transmission of the signal. The optional Network Node Argument field 428 contains any arguments that should be passed to the command.

As an example, a network node for a studio crosspoint switch which sent video to several different buildings might be filled in as follows:

| name: | STUDIO |
| title: | Studio crosspoint switch |
| network node to: | (BLDG4, SWITCH, 3) |
| network node to: | (BLDG4, SWITCH, 4) |
| network node to: | (BLDG5, SWITCH, 5) |
| network node to: | (BLDG5, SWITCH, 6) |

This shows that the studio transmits video from the crosspoint switch into the BLDG4 network device and the BLDG5 network devices. The STUDIO network device can send video from both switch output 3 and switch output 4 to BLDG4. The network device 115 can also send video from both switch output 5 and switch output 6 to BLDG5.

An optional Network Node To Cost field 429 includes cost of traversing transmitting or using the information, i.e., the cost of using the network device 115. For example, the cost can be measured in terms of a signal strength, a signal quality, a signal bandwidth, and a monetary dollar cost of equipment used. For instance, a fiber optics link would have a lower cost in terms of signal deterioration and bandwidth than a RF link.

FIG. 6 is a flow chart showing the steps of a routing process executed by computer 130 for routing a signal from a source 110 to a sink 120. The process 600 begins 605 by reading 610 text description of one of the Source/Sink Record Names 232 that is the source 110 of the signal. In step 615 the process 600 reads the text description 232 of the sink destination 120 of the signal. Typically, these source and sink text descriptions are entered by an operator of the system 100 as identifiers of the source 110 and sink 120 for the signal connection. The process then determines the name of the table 620 (table name 205) for the entered source and sink records. In a preferred embodiment, the operator enters the table name. Alternatively, the system 100 would have a table of addresses that would provide the table name 205 for the source and sink records text descriptions 232.

In step 625, the process 600 finds 625 the Source/Sink Record 225 with the entered text description 232 in the table 200 with the respective Table Name 205. The found Source/Sink Records represent the source 110 to be connected, or connected source. See FIG. 7 below. If no Source/Sink Record 225 is found, the process 600 returns an error 635. If a the Source/Sink record 225 for the source 110 is found, the process 600 continues by finding 640 a Source/Sink record 225 that corresponds to the sink 120 described by the text entry 615. This sink 120 is the sink to be connected or the connected sink. See FIG. 8 below. If 645 no Source/Sink record 225 for the described sink is found, the system 100 returns an error 650. If 645 the sink record is found, the process continues to find a path 655 (FIG. 9) that used to make the connection 670 (see FIG. 14) between the text entry described source 110 and sink 120. Note that steps 625, 630, 635, and 640, can be performed after steps 645, 650, 665, and 660.

If a path is not found 660 an error 665 is returned by the system. If a path is found 660, the connection is made. See FIG. 14. After the connection is made 670, the process 600 ends 675.

Figure 7A:
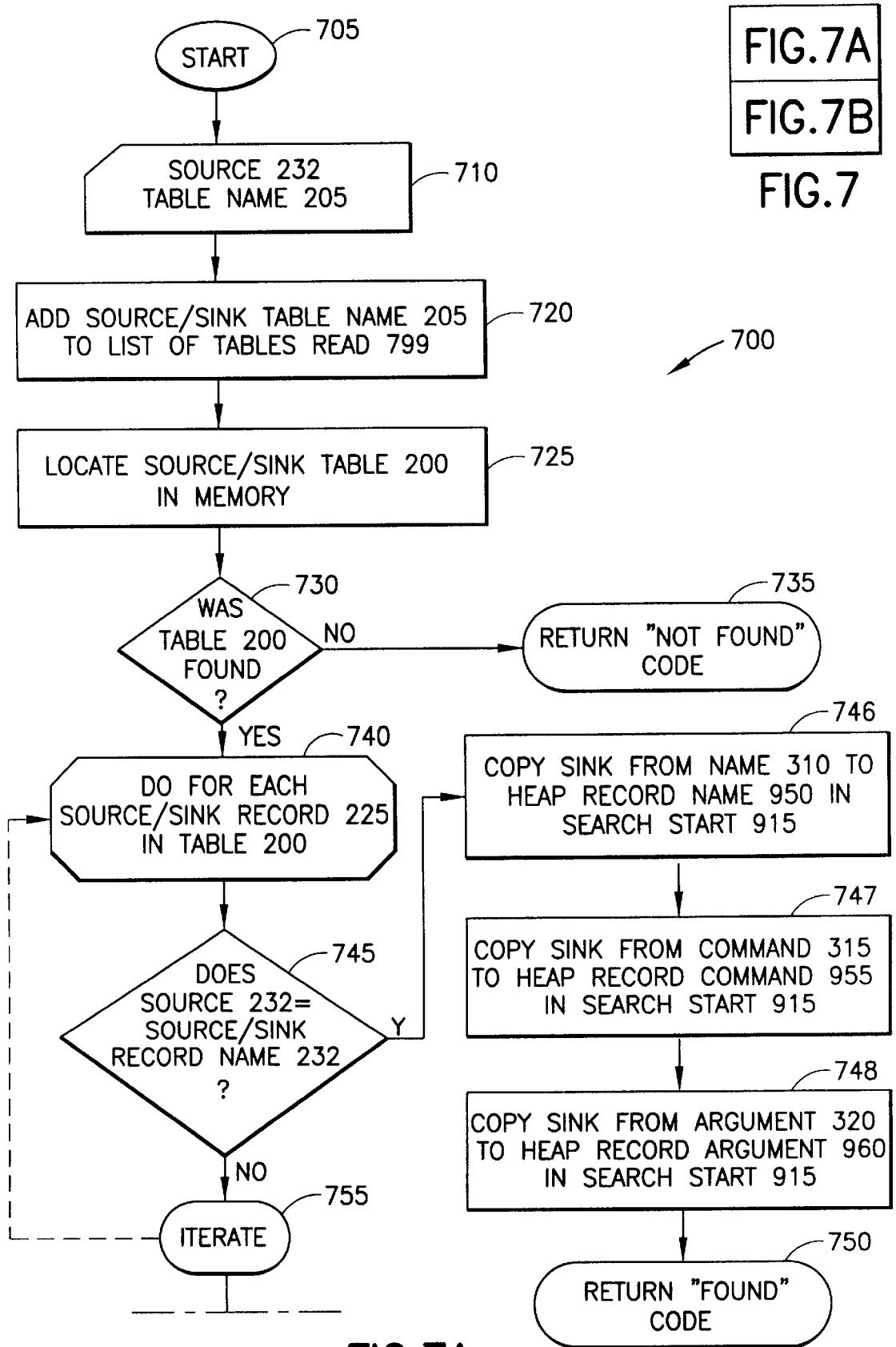
FIG. 7 is a flow chart showing the steps of finding a source/sink record used in the routing process for the source.
Figure 7B:
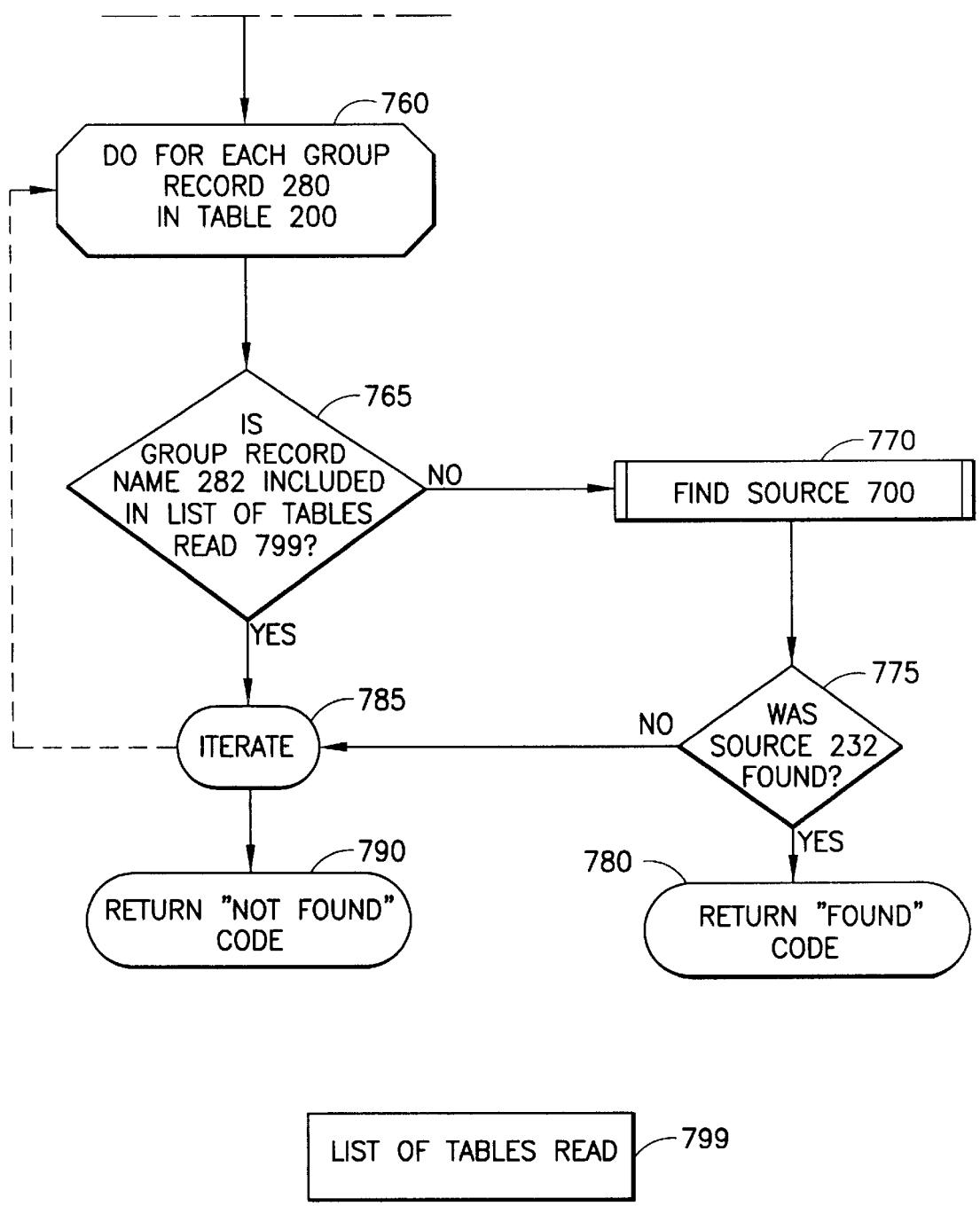

FIG. 7 is a flow chart showing the steps of finding a Source Source/Sink record 625 used in the routing process 600. This process 700 starts 705 by adding 720 the Table Name 205 provided by 710 process 600 to a "List Of Tables Read" 799. The "List Of Tables Read" 799 is a list of the tables read by process 700. This table 799 is reset with zero entries during the start 705. The process then attempts to locate the Table 200 named by the Table Name 205. A check 730 is performed to see if the table named was found. If not, a code value is set to "Table not Found" or "Not Found." This error 725 will cause error 635 to be returned if no Table 200 in the Table Set 215 because it is the first pass through the process 700, i.e., no table in the system 100 exists.

If 730 the table is found, the process 700 searches for the Source/Sink record 225 entered 710 in the found table. See steps 740, 745, 750, and 755. In step 745, the Name 232 of a first Source/Sink record 225 is compared to the entered Name 710. Alternatively, the Title 234 of a first Source/Sink record 225 is compared to the Entered Name 710. If there is a match, the matched record is stored. This is done in step 746 by copying the Sink From Name 310 to a Heap Record 900 called Search Start 915 (below). This identifies a first node in a connection path defined by two or more of these Heap Records 900 (see below). In step 747 the Sink From Command 315 is copied to a Heap Record Command field 955 in the Search Start 915 Heap Record 900. In similar manner (step 748), the Sink From Argument 320 is copied to a Heap Record Argument field 960. Once this is done, the code value is set to "Found" 750 and process 700 ends. If this is the first pass through process 700, the system 100 begins executing again at step 640 in FIG. 6.

If there is no match 745, the process 700 iterates 755 for each of the remaining 740 Source/Sink Records 225 in the found table 200.

If no matching Source/Sink records 225 are found, an iteration is performed in steps 760, 765, and 785 for each of the Group Records 280 in the found table 200. For each of the Group Records 280 in the Found Table 200, the Group Record Name 282 is compared to the names on the List Of Tables Read 799. If the Group Record Name 283 is found, than the process 700 iterates 785 to select a Next Group Record 760. However, if the Group Record Name 282 is not found, the process 700 is recursively called, starting at 705, for the next Group Record. A comparison 775 is done to determine if the recursive call to 705 finds the Source/Sink name 232. If the Source/Sink name 232 is found, the code value is set to "Found" and process 700 ends. If not, the process iterates 785 on each of the remaining next Group Records until all the Source/Sink names 232 in every Group Record is compared 775. If no matches are found, the code value is set to "Not Found" 790 and process 700 ends. At this point 790, the error 635 is returned.

Recursive calls are known. For example, see *Data Structures and Algorithms* by Aho et al. which is herein incorporated by reference in its entirety. (See specifically Section 2.6.) By using recursive calls, the system 100 is able to check every Source/Sink Name 232 in a table that has one or more groups each having zero or more Source/Sink records. By using recursive calls along with a stack, the traversal of these groups can be monitored and performed even though the groups are arranged in a hierarchy.

Figure 8A:
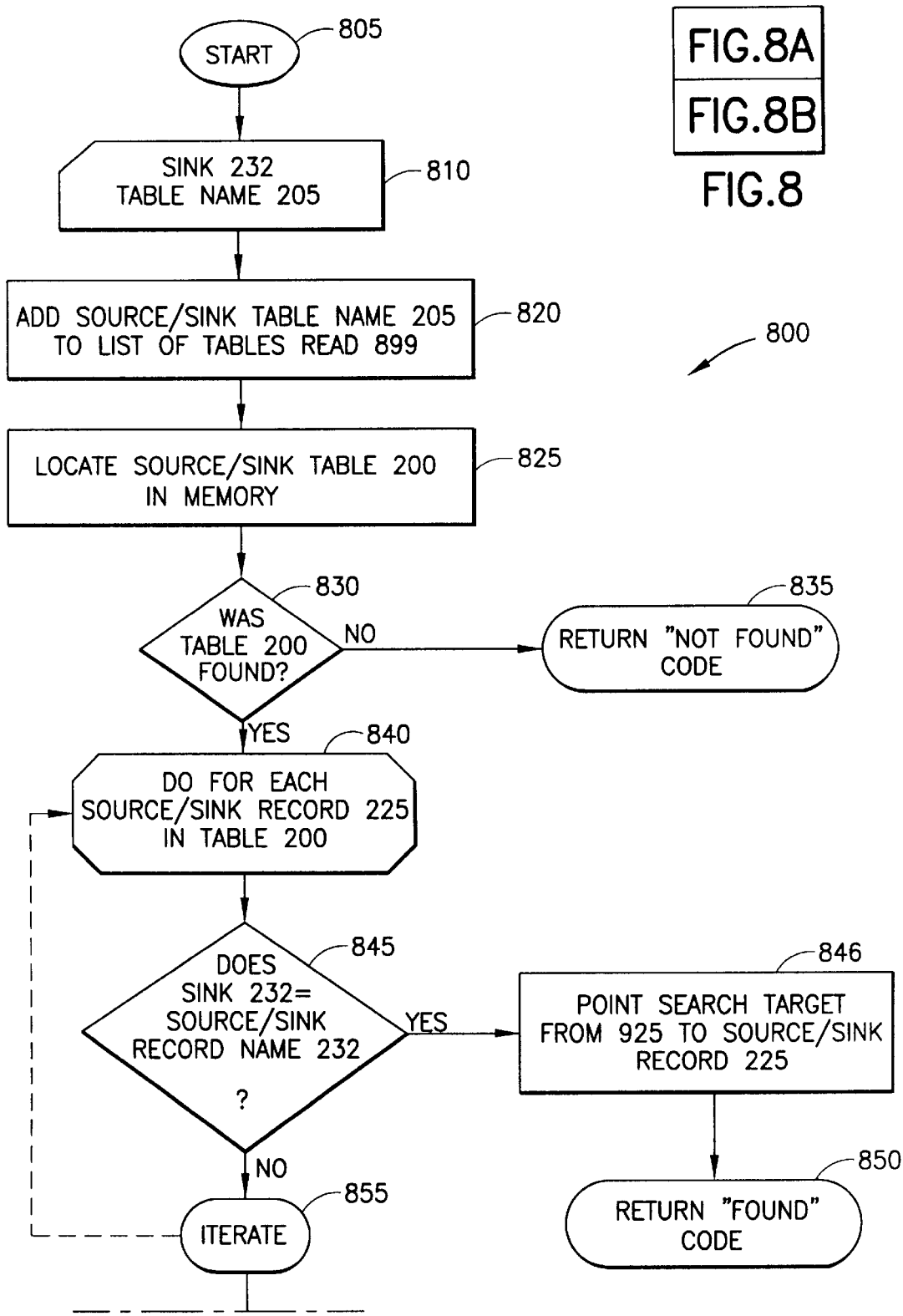
FIG. 8 is a flow chart showing the steps of finding a source/sink record used in the routing process for the sink.
Figure 8B:
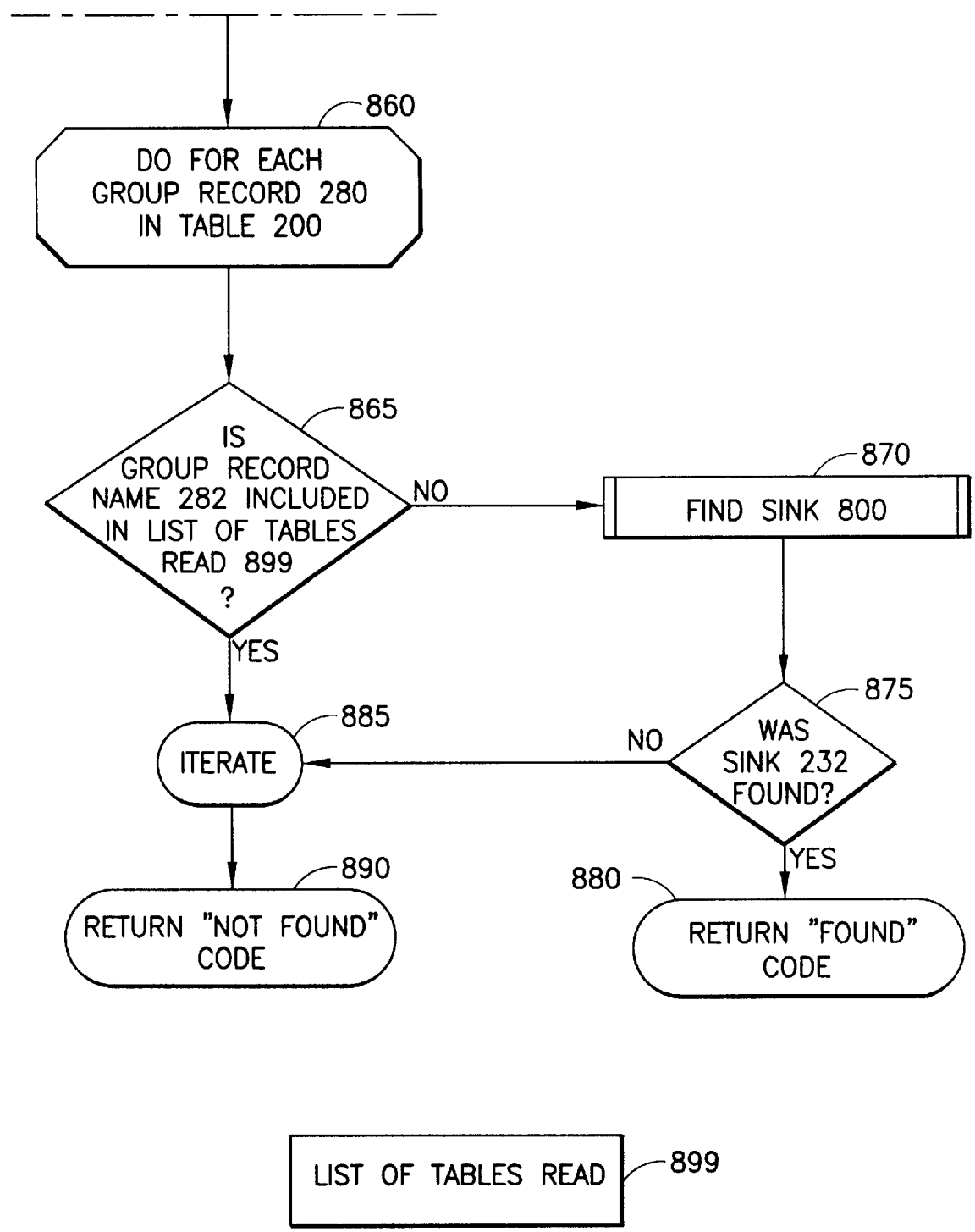

FIG. 8 is a flow chart showing the steps of finding a Sink Source/Sink record 625 used in the routing process 600. This process 800 starts 805 by adding 820 the Table Name 205 provided by 810 process 600 to a "List Of Tables Read" 899. The "List Of Tables Read" 899 is a list of the tables read by process 800. This table 899 is reset with zero entries during the start 805. The process then attempts to locate the Table 200 named by the Table Name 205. A check 830 is performed to see if the table named was found. If not, a code value is set to "Table not Found" or "Not Found." This error 825 will cause error 635 to be returned if no Table 200 in the Table Set 215 because it is the first pass through the process 800, i.e., no table in the system 100 exists.

If 830 the table is found, the process 800 searches for the Source/Sink record 225 entered 810 in the found table. See steps 840, 845, 850, and 855. In step 845, the Name 232 of a first Source/Sink record 225 is compared to the entered Name 810. Alternatively, in step 845, the Title 234 of a first Source/Sink record 225 is compared to the entered Name 810. If there is a match 845, a pointer (925 below) is stored 846 so that the matched Source/Sink record 225 can be referenced during the connection process FIG. 14.) Once this is done, the code value is set to "Found" 850 and process 800 ends. If this is the first pass through process 800, the system 100 begins executing again at step 640 in FIG. 6.

If there is no match 845, the process 800 iterates 855 for each of the remaining 840 Source/Sink records 225 in the found table 200.

If no matching Source/Sink records 225 are found, an iteration is performed in steps 860, 865, and 885 for each of the Group Records 280 in the found Table 200. For each of the Group Records 280 in the found Table 200, the Group Record Name 282 is compared to the names on the List Of Tables Read 899. If the Group Record Name 283 is found, than the process 800 iterates 885 to select a next Group Record 860. However, if the Group Record Name 282 is not found, the process 800 is recursively called (see above), starting at 805, for the next Group Record. A comparison 875 is done to determine if the recursive call to 805 finds the Source/Sink Name 232. If the Source/Sink Name 232 is found, the code value is set to "Found" and process 800 ends. If not, the process iterates 885 on each of the remaining next Group Records 280 until all the Source/Sink Names 232 in every Group Record is compared 875. If no matches are found, the code value is set to "Not Found" 890 and process 800 ends. At this point 890, the error 635 is returned.

Figure 9:
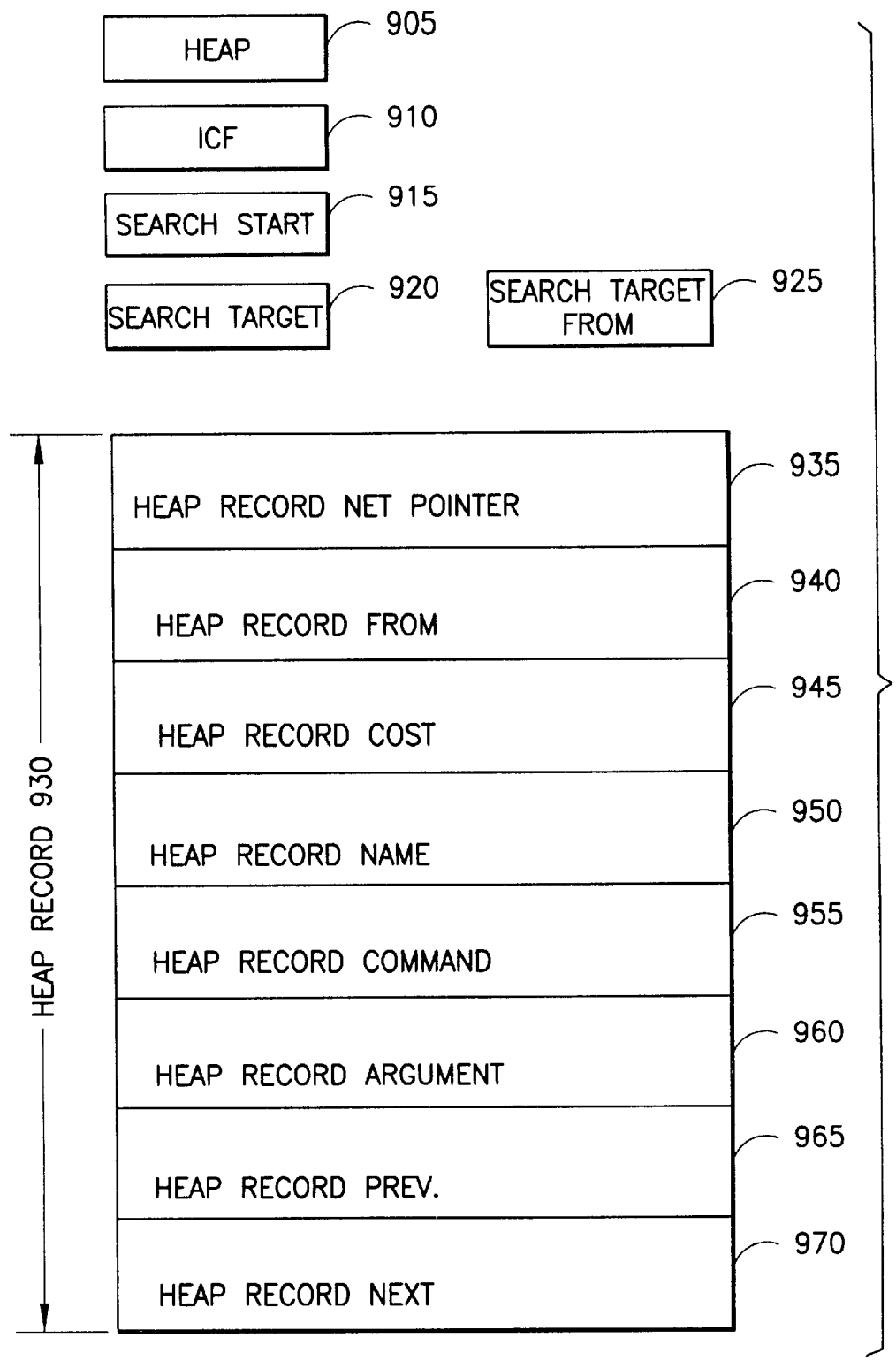
FIG. 9 is a block diagram of a data structure of a heap record and variable records used to traverse the heap record.

FIG. 9 is a block diagram of a data structure of a Heap Record 900 and variable records used to traverse the Heap Record 900. In the system 100 there are typically a plurality of Heap Records 900 in a Heap 999. The Heap Records 900 contain information about connection paths between any given source 110 and any given Network Device 115 and/or sink 120. Part of a path finding process 1100 (described below) creates Heap Records that are added to the Heap 999 of the system 100. After the path finding process 1100 is run, the Heap 999 will contain Heap Records 900 for an optimal path between a given Connected Source 110 and a given Connected Destination/Sink 120. Heap Records 900 can also contain information (sometimes incomplete) about other paths between the Connected Source 110 and the Connected Sink 120.

Each Heap Record 900 contains the following fields: a Heap Record Net Pointer (net pointer) 935, a Heap Record From 940, a Heap Record Cost 945, a Heap Record Name 950, a Heap Record Command 955, a Heap Record Argument 960, a Heap Record Previous 965, and a Heap Record Next 970.

The Net Pointer 935 is used to point to a Network Node 400 that contains information needed to establish a connection between a source 110 and the Network Node 400.

The Heap Record From 940 is used to point to a previous Heap Record 900F on a best, e.g., minimum cost connection path. The previous Heap Record 900F contains information about a Network Node 400 from which the Heap Record receives information, e.g., a video signal. Traversal through the Heap 999 by visiting each consecutive Heap Record 900 contained in the Heap Record From field, gives the best path (least costly path) from the device represented by the first Heap Record 900 to the connected source 110 associated with the Heap 999. Therefore, process 1100 creates a Heap 999 that gives the path from the Connected Source 110 to the Connected Sink 120. In a preferred embodiment, this path is the least cost path as defined by the cost factors in field 429.

The Heap Record Cost 945 holds a cost value that represents the cost of the connection path from the source 115 to the Network Node 400 represented by the Heap Record 400. Cost can be measured in a number of ways. For example, as stated above, cost can be measured by: dollar cost of equipment used in in the connection, quality of signal in the connection (e.g. longer connections may have more noise), use of equipment bandwidth, or any combination of these.

The Heap Record Name 950 is typically a alphanumeric field containing the name of the Network Node 400 associated with the Heap Record 900.

The Heap Record Command 955 contains the command that establishes the connection from the Network Node 400 represented by the previous Heap Record to the Network Node 400 represented by the Heap Record 900. (By the previous Heap Record is meant the Heap Record 900F that is pointed to by the heap record from field 940.)

The Heap Record Argument field 960 contains any arguments that need to be passed along with the command in the Heap Record Command field 955.

The Heap Record Prev 965 and the Heap Record Next 970 fields are used to sort all of the Heap Records 900 in the Heap 999 in a doubly linked list (page 50 of Aho et al.) so that all of the heap records in the Heap 999 are order in order of cost 429. This ordering occurs by applying a version of Dijkstra's Algorithm (page 203, Aho et al.) in the shown in FIG. 11. Other algorithms are envisioned, for example, that described in chapter IV. 7. of *Data Structures and Algorithms 2: Graph Algorithms and NP-Completeness* by Kurt Melhom which is herein incorporated by reference, and Floyd's Algorithm (page 208, Aho et al.)

Note that there are global records that are stored in the memory of the system 100. These global records include: a Heap 905 (a pointer to the Heap Record 900 identifying the source 115), a Least Cost Frontier or lcf global record 910 (a pointer to a Heap Record 900), a Search Start 915, and Search Target 920. The Search Start 915 is the Heap Record 900 that represents the source 110 and the Search Target 920 is the Heap Record 900 that represents the destination 120.

Figure 10:
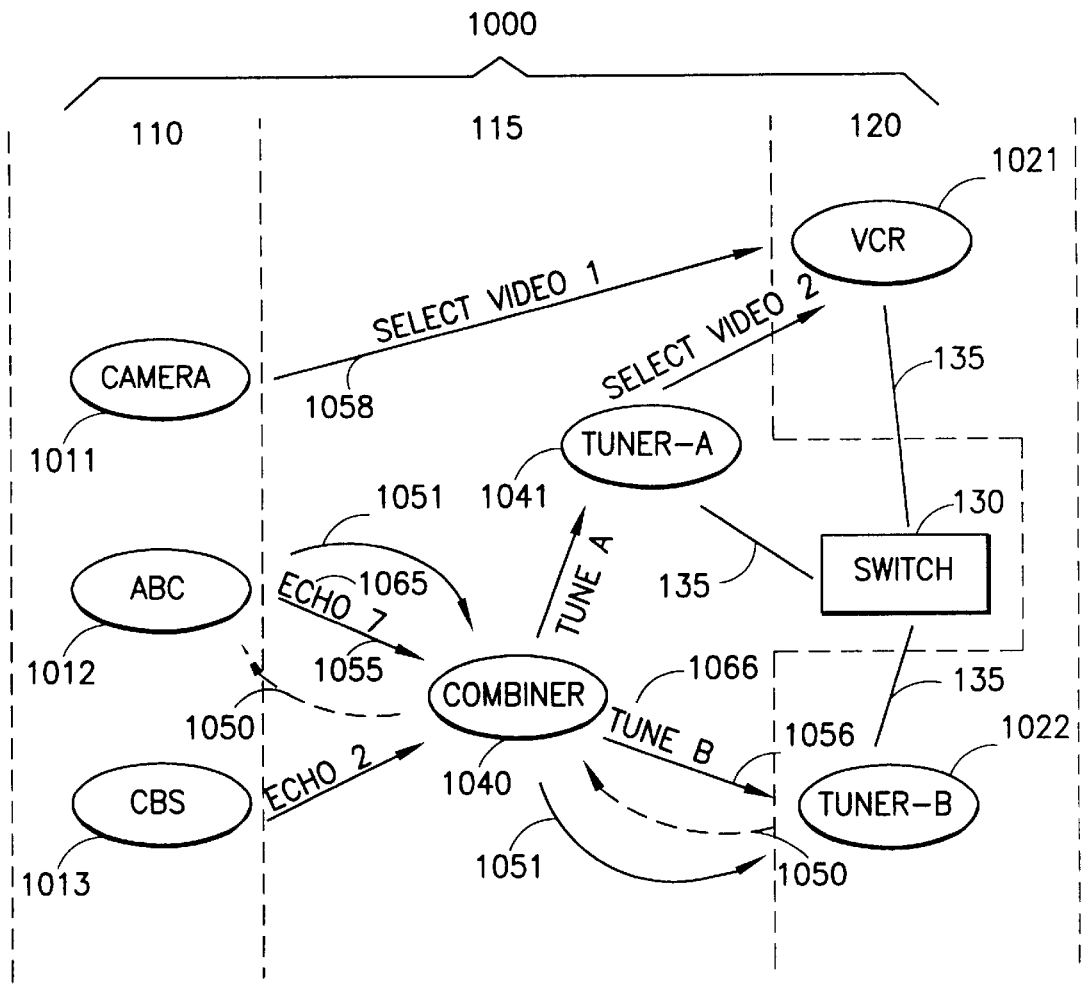
FIG. 10 is an example connection diagram.

FIG. 10 is a non limiting example connection diagram 1000 of a simple network 100. In this example, the sources 110 include a camera 1011, an ABC television station 1012, and a CBS television station 1013. The sinks 120 include a VCR 1021 and a tuner 1022 (tuner B). The network devices 115 include a combiner 1040 and a tuner 1041 (tuner A). Several of the network devices are physically connected. These physical connections are represented by edges in the directed graph—typical edges are 1055, 1056, and 1058. Process 1100, in FIG. 11 below, determines a path 1050 that is used to connected the ABC television station 1012, the connected source, to the tuner B 1022, the connected sink. The path goes through the combiner 1040 and has the direction from the tuner B 1022 to the station 1012. During the connection process 1400, FIG. 14, the path is reversed 1051. "Echo 7" 1065 and "tune B" 1066 are commands that are associated with their respective edges (1055, 1056) and will be used by the connection process 1400 to connect the connected source 1012 to the connected sink 1022. Other commands, used by their respective network devices, e.g., "Echo 2" are shown but are not used by the connection process 1400 to establish the connection.

Figure 11:
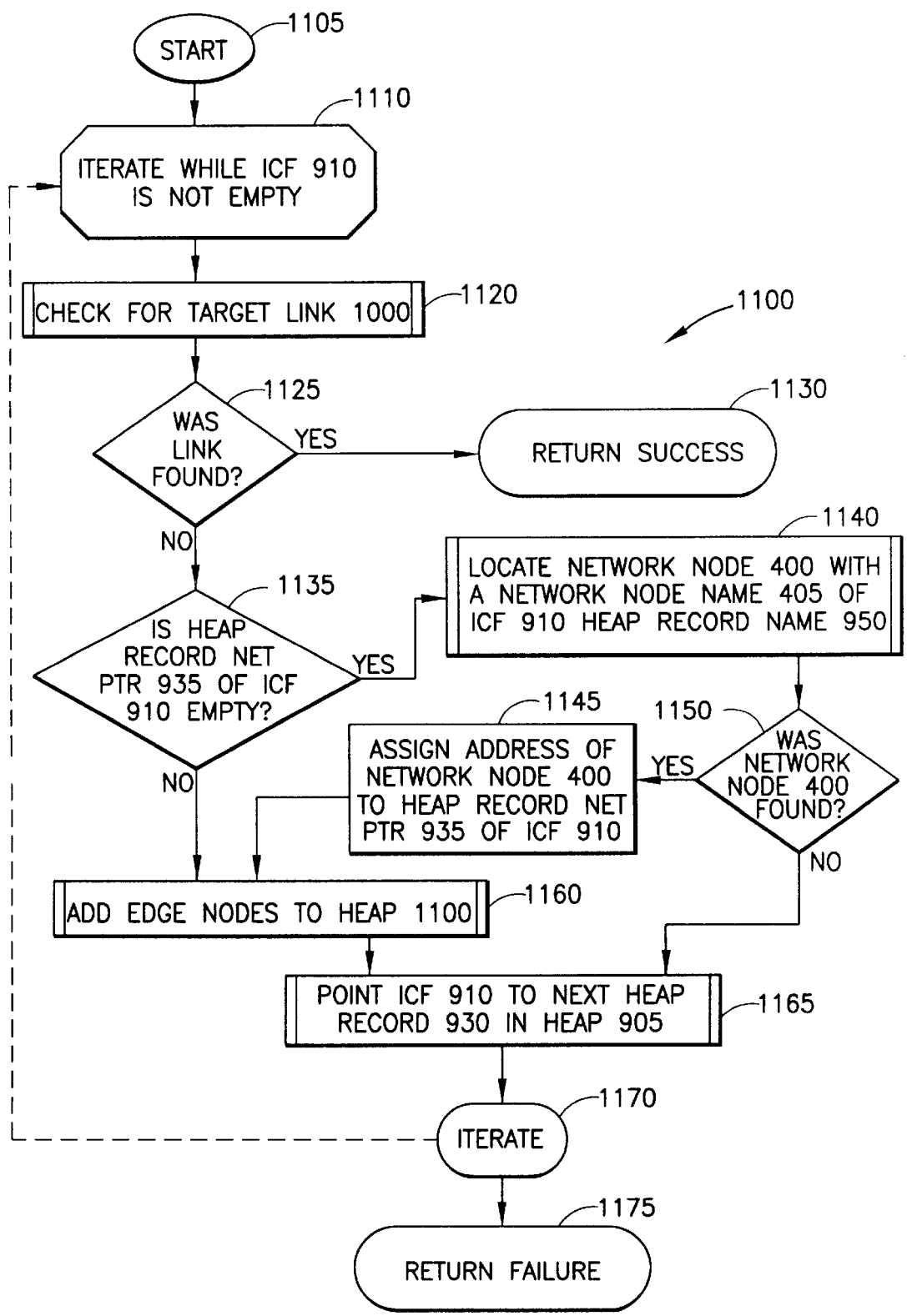
FIG. 11 is a flow chart of a path finding process that determines one of the best connection paths between any given source and sink.

FIG. 11 is a flow chart of a path finding (path finder) process that determines one of the best connection paths between any given source 110 and sink 120.

In step 1105, a Heap Record 900 that describes a requested source 110 is created in process 700 (steps 746, 747, and 748). The lcf 910 is also initialized with a pointer that points to the Search Start location 915. As this path finder process 1100 continues, the process builds and traverses the Heap Records 900 in the Heap 999 that represents possible paths between the source 110 and destination 120. This is done by iterating 1110 through the process 1100 while the lcf location 910 not null. The lcf location 910 using the doubly linked list structure keeps track of which Heap Records 900 in the Heap 999 have been traversed and which Heap Records 900 have not been traversed.

In step 1120, the first step of the iteration, the process 1100 checks to see if there is a direct link between the Heap Record 900 that is being currently processed and the destination 120. This is done in the target link check process 1200, described in FIG. 12 below. If there is a direct link, the path (Heap 999) is complete 1130 and the process 1100 has successfully found a path between the Connected Source 110 and the Connected Sink 120. If there is no direct link between the current Heap Record 900 and the destination 120, step 1135 determines if there is a Network Node 400 (representing a Network Device 115) contained in the Net Ptr field 935 of the Heap Record 900. If the Net Ptr 935 is not null, the process 1100 continues to step 1160 where new Heap Records 900 are created for each of the Network Nodes 400 to which the current Network Node 400 points. These "edge nodes" are identified in the Network Node To field(s) 425 of the Network Node 400. In this step 1160, the Heap Record fields 940, 945, 950, 955, 960, 965, and 970 are filled in by edge adder process 1300 described in FIG. 13. The lcf field is then indexed (step 1165) to point to the Next Heap Record 900 in the Heap 999 and the process 1100 iterates 1170 at step 1110 if the lcf field 910 is not null.

If 1135 the Net Ptr field 935 is null, the process 1100 accesses the Network Node 400 name from the Heap Record Name 950 field and tries to get the location of the named Network Node 400 to place in the lcf 910 field. The location of the Network Node 400 is found by searching the Network Node Set 435 (in FIG. 4) to match the name in the Heap Record Name field 950 with the Network Node Name 405. If the Network Node 400 is not found (no match) 1150 the process continues at step 1165. When there is a match 1150, the location in the Network Node (i.e., the starting address of the network node table) 400 is placed 1145 in the Net Ptr field 935 and the process continues to step 1160.

Upon completion of one iteration 1170 of process 1100, information is entered into all of the fields of one of the Heap Records 900 of the Heap 999 and process 1100 has traversed one Heap Record 900 (representing a Network Device 115) along the least costly connection path between the source 110 and destination 120.

Figure 12:
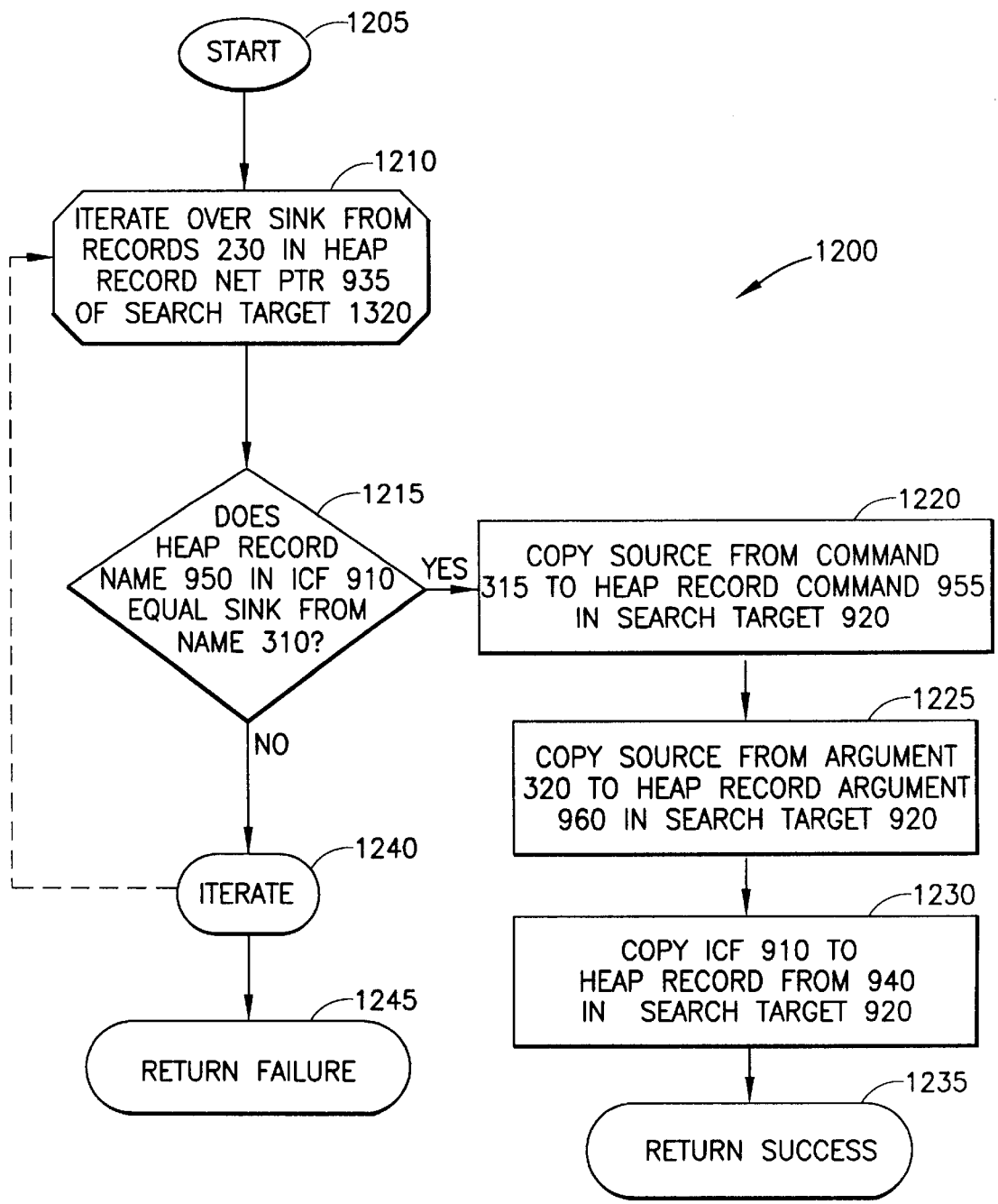
FIG. 12 is a flow chart showing the steps of checking for a target link in the finding a path step.

FIG. 12 is a flow chart showing the steps of checking if there is link between the Heap Record 900 being processed 1100 and the destination 120. The target checking process 1200 begins 1205 by iterating 1210 over all the Sink From records 230 in the Source/Sink Record 225 for the target/destination 120.

If 1215 the Heap Record Name 950 of the (current) Heap Record 900 being processed 1100 (identified in the lcf field 910) is equal to the Sink From Name 310 in one of the Sink From Records 230, the current Heap Record 900 has a direct link to the destination 120. When there is a direct link, the Source From Command 315 of the Sink From Record 230 is copied into the Heap Record Command field 935 in Search Target 920 location (i.e., the Heap Record 900 representing the target/destination 120). Further, the Source From Argument 320 of the Sink From Record 230 is entered into the Heap Record Argument field 960 in the Search Target 920 Heap Record 900. Also the location in the lcf field is copied into the Heap Record From Field 940 of the Search Target 920. The control is then passed again to the path finder process 1100.

If 1215 the Heap Record Name 950 of the current Heap Record 900 being processed 1100 is not equal to the Sink From Name 310 the target checking process 1200 iterates 1240 until all of the sink from records 230 have been checked. If no link is found after iterating over all of the Sink From Records 230, the target checking process 1200 ends 1245 not without finding a direct link between the current Heap Record 900 and the target/destination 120.

Figure 13:
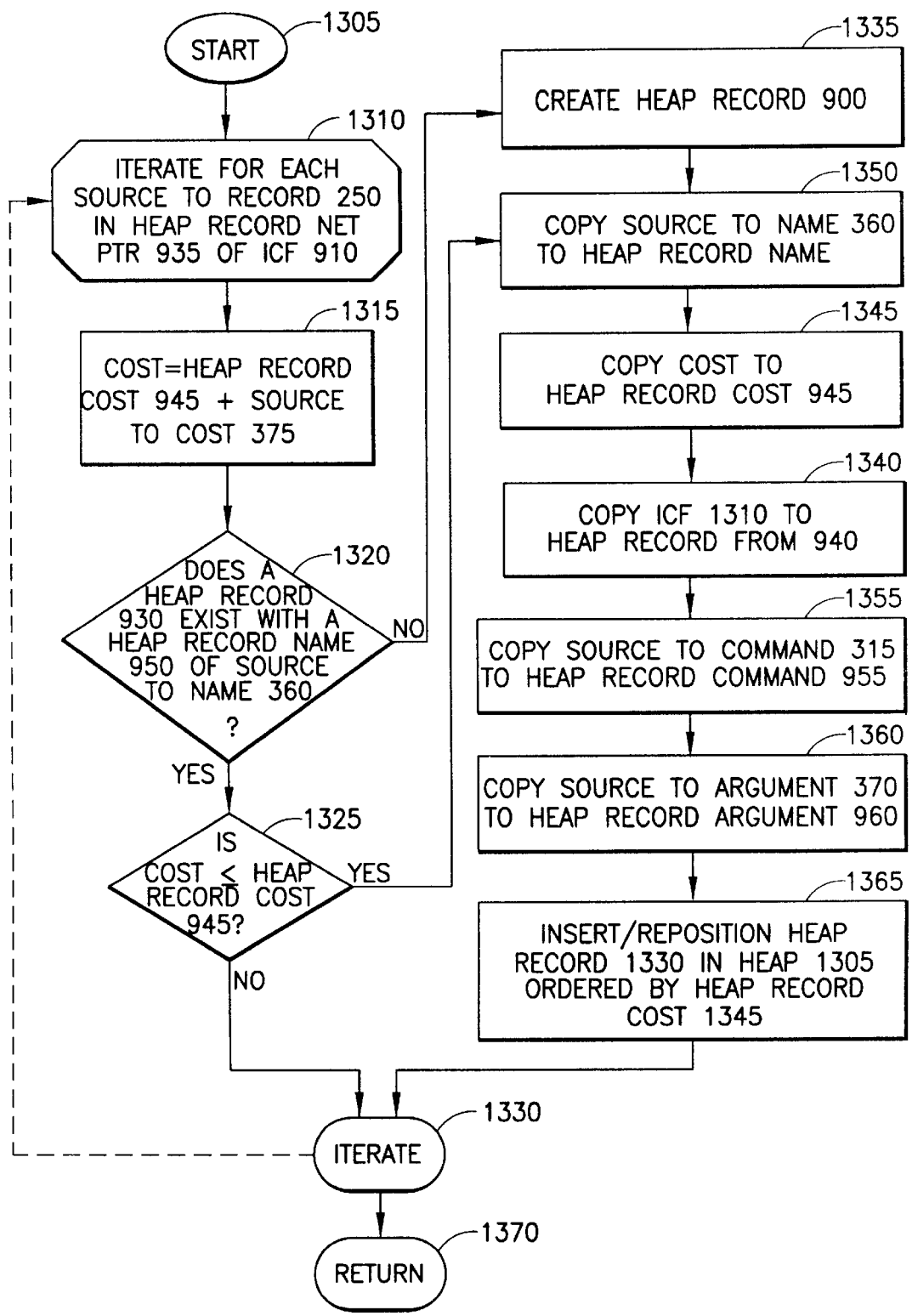
FIG. 13 is a flow chart showing the steps of adding edge nodes.

FIG. 13 is a flow chart showing the steps of adding edge nodes and is also called during the path finding process 1100. This edge node process 1300 adds Heap Records 900 and fills in information in the added Heap Records 900 as the path finding process 1100 traverses the heap 999. The edge node process finds links from the current Heap Record 900 to Heap Records 900 (network nodes) to which the current node is connected.

The edge node process begins 1305 by iterating over each Source To Record 250 or Network Node To Record 425 in the Source/Sink Records 230 or Network Node 400, respectively that are designated in the current Heap Record Net Pointer Field 935.

In step 1315, the cost to go from the source 110 through the current heap 900 to one of the next heaps 900, i.e., next cost value, is determined by adding the value in the Heap Record Cost Field 945 to the cost of going to the next heap in the Source To Cost Field 375.

After determining the next cost value to traverse to the next Heap Record 900, the entire heap is searched 1320 to determine if the next Heap Record 900 already exists, i.e., has been reached by another path. This search is done by comparing 1320 the Source To Name 360 in the Source To Record 250 or the Network To Name 426 in the Network Node To 425 to the Heap Record Name 950 in every Heap Record 900 of the Heap 999. If there is no match, a new Heap Record 900 is created (step 1335.) The edge node process then continues at step 1345. If there is a match, i.e. the next Heap Record 900 was previously reached by another path, a cost comparison between the costs of the previous path and the current path is made 1325. If the current path is more expensive than the previous path, the edge node process 1300 iterates 1330 starting at step 1310. This has the effect of discarding the current, more expensive path. However, if the current path is less expensive that the previous path, the Heap Record fields (940, 945, 950, 955, 960, 965, and 970) are over written. This has the effect of discarding the previous, more expensive path.

The Heap Record fields are over written starting with step 1340. In step 1340, the Heap Record From field 940 is over written with the value contained in the lcf field 910. This has the effect of inserting the current Heap Record 900 of the path from the source 110 to the current Heap Record 900 and possibly to the destination 120. In step 1345, the Heap Record Cost Field 945 is over written with the cost of the current path. This has the effect of tracking the cost of a connection from the source 110 to the next Heap Record 900. In step 1350, the Heap Record Name Field 950 is over written with the value contained in the Source To Name 360 or Network Node To Name 426 of the Source To Record 250 or the Network Node To Record 425, respectively. This has the effect indicating which network device 115 the Heap Record 900 represents. In step 1355, the Heap Record Command Field 955 is over written with the Source To Command 365 in the Source to Record 250 or the Network Node Command 427 of the Network Node To Record 425. In step 1360, the Heap Record Argument Field 960 is over written with the Source To Argument 370 in the Source to Record 250 or the Network Node Argument 428 of the Network Node To Record 425. The over writing the Commands and Arguments have the effect of recording the Command and Arguments that are need to establish a connection between the devices represented by the current and next Heap Records 900. In step 1365 the Heap Record Previous 965 and the Heap Record Next 970 Fields are over written by prior art methods of inserting and/or repositioning heap records in doubly linked lists that are sorted by cost. (See Aho pages 50–53.)

Figure 14A:
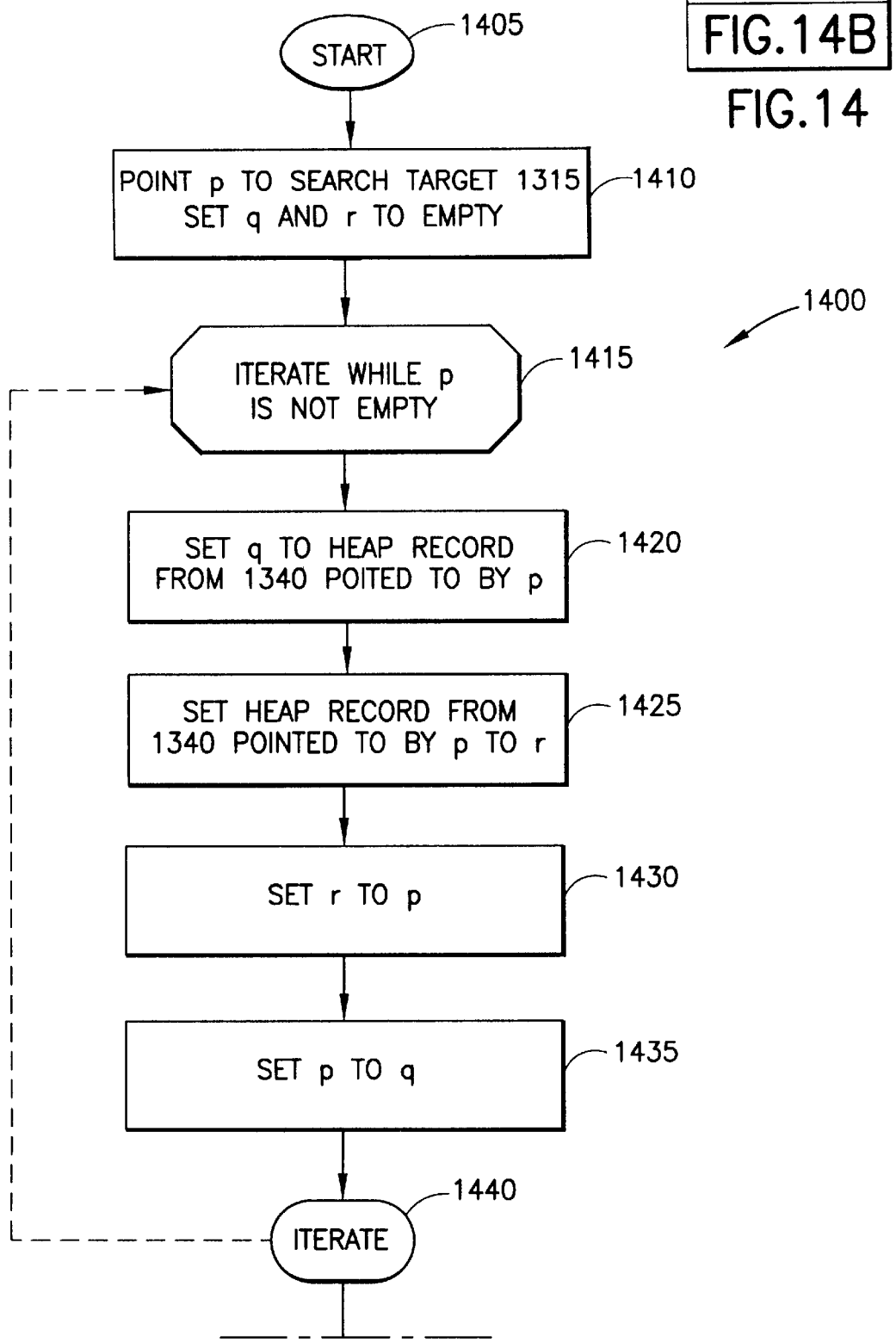
FIG. 14 is a flow chart of a connector process which shows the steps of establishing a connection between any given source and sink.
Figure 14B:
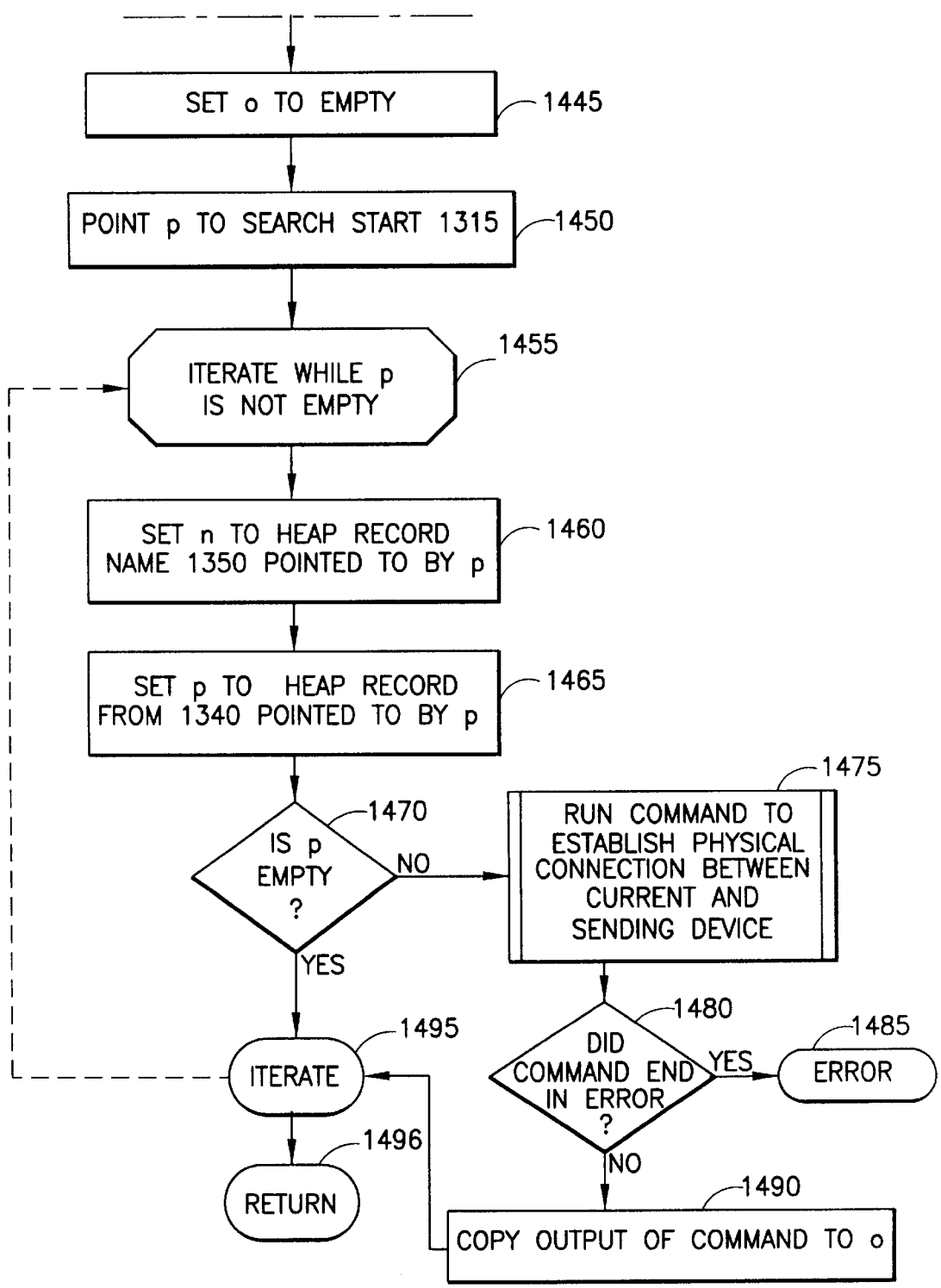

FIG. 14 is a flow chart of a connector process 1400 which shows the steps of establishing a connection between any given source 110 and sink 120. Once an optimal connection path is determined by the path finding process 1100, the connector process 1400 makes the physical connections necessary to establish a function connection between or among any given source 110, network 115, and sink 120 device(s). The connector process 1400 begins 1405 by performing steps 1410, 1415, 1420, 1425, 1430, 1435, and 1440 which traverse the linked list of Heap Records 900 generated by the path finding process 1100. The connector process 1400 starts from the Heap Record 900 of the sink 120, i.e., the Search Target 920 to the Heap Record 900 of the source 110, i.e. the Search Start 915. During this traversal, each link 940 between a Heap Record and its adjacent Heap Record is reversed. The end result of this traversal is that the linked list now starts at the Search Start 915 and ends at the Search Target 920.

For example, one preferred way of doing this "reverse traversal" is shown in steps 1410, 1415, 1420, 1425, 1430, 1435, and 1440. In step 1410, the temporary variables p, q, and r, are initially set to the search target 915 heap record (e.g. by a pointer), null, and null respectively. While there are still heap records 900 on the path, steps 1420, 1425, 1430, and 1435 are iterated (steps 1415 and 1440). Step 1420 copies the (value of the) Heap Record From field to a temporary variable q. Then step 1425 copies the value of the temporary variable r into the Heap Record From field 940. Step 1430 copies the value in p to r and step 1435 copies the value in p to q. Therefore, by doing this iteration 1440 while there are devices in the path, i.e., the value of p is not null, the Heap Record From field 940 for each device in the path is changed to point to the device in the opposite direction on the path from where it pointed prior to running the connector process 1400.

Now that a path is known between any given source 110 and sink 120, the remainder of the connector process 1400 establishes the physical connection between each of the devices on the path by using connection information (955, 960) given in each of the Heap Records 900 describing devices along the path.

This begins 1445 by initializing a temporary variable o to empty. In a preferred embodiment, a block of memory is initialized. This block is large enough to store channel information for any given device in the system 100.

In step 1450, a temporary variable P is set to point to the search start 915 Heap Record 900, i.e. the current Heap Record. While there are unprocessed Heap Records 900, the connection process 1400 iterates 1455 over the following steps.

In step 1460, a temporary variable N is set to the Heap Record Name 950 of the current Heap Record. In step 1465, P is "moved" to the next device (Heap Record) on the path by setting P to the (value in the) "Heap Record From field 940 of the current Heap Record. If there is no value (null) in this Heap Record From field 940, the iteration 1495 returns 1496. This occurs after the connection process 1400 has processed every device (Heap Record 900) on the path.

If there are still Heap Records on the path to process, i.e., if there is a device on the path sending information to the device represented by the current Heap Record, step 1475 is performed for the current Heap Record. In step 1475, the command is run to establish the physical connection, or link, between the device represented by the current Heap Record 900 (current device) and the device on the connection path that sends information to the current device (sending device).

How the physical connection is established between the current device and the sending device depends on the characteristics of the current and sending devices. These physical connections are established by running device specific commands. For example, if the sending device is a cross point (video) switch 125 and the current device is any device that is capable of receiving (video) information from the cross point switch 125, the Command 1475 can be an RS-232 command. This command would appear in the Heap Record Command field 955 of the current Heap Record. Furthermore, if the sending device is a frequency agile demodulator (a device that converts an chosen broad band signal into a baseband signal, e.g. the LAN1001R by ISS Engineering Inc, and the PS/2 TV, IBM product number 93F1431) and the current device is any device that is capable of receiving baseband information (e.g., a cross point switch 125, a television monitor, an RF modulator, or a Video Cassette Recorder), the Command 1475 can be any command accepted by the agile demodulator, like a RS-432 or RS-422 command. (Any known agile modulator/ demodulator can be used.) These commands typically select a reception frequency and tune the demodulator to that selected frequency. If the sending device is a playback device, including a Video Cassette Recorder (VCR), a laser disc player, Compact Disk (CD) player, or Digital Audio Tape (DAT) that is capable of transmitting video, audio, and/or digital information, and the current device is any device capable of receiving this information, the Command 1475 would be a command to load and play the appropriate media, e.g. video tape, CD, or digital tape. These commands typical are in the RS-232 format and are device specific. Again the Command 1475 is located in the Heap Record Command field 955 of the current Heap Record.

Note that the sending device also can be a passive device including coaxial cables or other broad band trunk lines that can be connected to any type of compatible current device. In these cases, the Command 1475 would return arguments that are past to the command through the passive device. In essence, the command "echoes" the arguments sent through the passive device from another device in the connection path.

The sending device also can be a conversion device including amplifiers or media converters, (radio frequency to fiber optics and visa versa) and the current device is capable of receiving the converted information. Here the command again "echoes" the arguments that are sent through the conversion device.

The sending device can be an interface to a routed (Internet) or switched (Public Switched Telephone Network (PSTN) or Asynchronous Transfer Mode (ATM)) network like an Integrated Services Data Network (ISDN) line. In these cases the current device can be device that is compatible with the network interface and the command would establish a session over the network. For example, the command could include dialing information to establish a telephone connection or Internet addresses to establish a TCP/IP session. Alternatively, if the sending device is an ATM (digital) switch 125B and the current device is any device that is capable of receiving (digital) information from the ATM switch 125B, the Command 1475 can be an ATM command. This command would appear in the Heap Record Command field 955 of the current Heap Record.

Step 1480 checks if the command is executed correctly. If not, an error message is sent to the Routing Process 675 and the Connector Process 1400 ends 1485. If the command is executed correctly, the return value of the command is copied into the variable (memory) o. Examples of these returned values are: the channel selected by an agile modulator, a switch point (output, socket, machine and port address, etc.) of a switched or routed network, and arguments of the commands.

Figure 15:
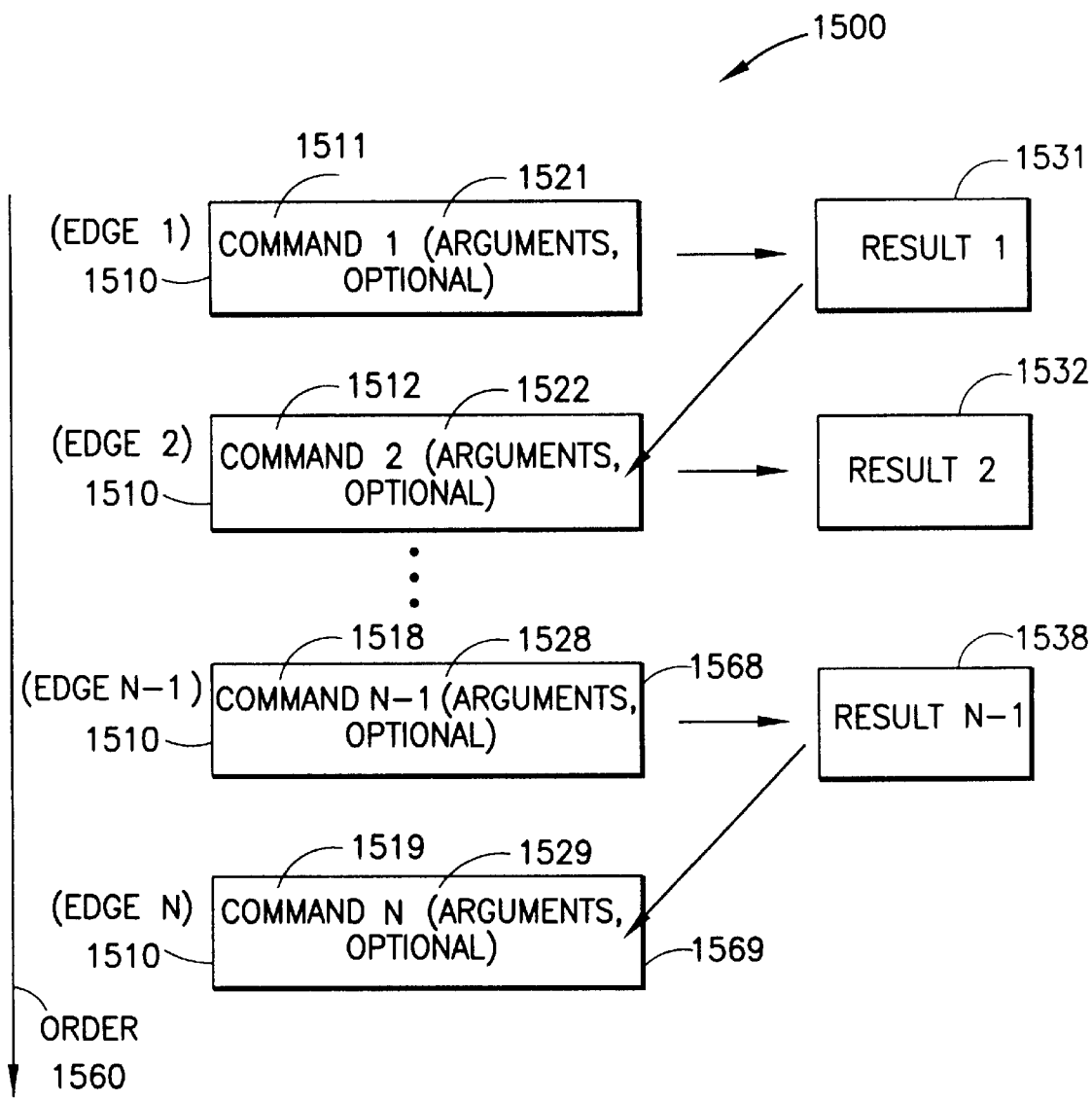
FIG. 15 is block diagram of a general command executed by the Connector Process.

FIG. 15 is block diagram of a general command structure executed by the Connector Process 1400. The command structure 1500 comprises a series of one or more commands, typically 1510, that are executed in an order 1560. The order 1560 is the order determined by reversing the path (in the example in FIG. 10, this order 1560 is 1051.) Each command 1510 corresponds to an edge in the directed graph, however, these edges need not be in the command structure 1500 because they are implied by the path and the order 1560. Each command 1510 is an executable function (1511, 1512, 1518, 1519) that is performed by the To Device to establish the connection (or disconnection) between the To Device and the From Device connected by the connection represented by the edge associated with the command 1510. Optionally, the command 1510, has an argument (1521, 1522, 1528, 1529) that is used by the executable function. The command executable function uses the argument to produce a result 1531, 1532, 1538. Generally, the argument is the result produced by the command that is prior in the order 1560. For example, command 1569 uses the result 1538 of the prior command 1568 as its argument 1529.

To expand on the example in FIG. 10, command 1568 would be an "echo" command that has a fixed argument 1528 of "7". Therefore, when the executable function 1518 of command 1568 is executed by process 1400, an "7" is produced as the result 1538. The command 1569 is a "tune" command and uses with a fixed argument 1529 of "B" and uses the result 1538, "7", as an additional variable argument 1529 to tune tuner B to channel 7. In this example, command 1569 is the last command in the order 1560 of path traversal.

In one preferred embodiment, the executable functions, e.g. 1511, are UNIX commands and the result, e.g. 1531, is a UNIX file or "pipe" that is passed from one executable function, e.g. 1511, to another to traverse the path in the order 1560. The order 1560 is determined by the sequence of the UNIX commands. For example:

ECHO 7 | TUNE B is a UNIX statement, where ECHO is the UNIX command, i.e. the executable function, 1511, "7" is the (fixed) argument 1521, TUNE is a second UNIX command, used as the executable function 1512, "B" is the (fixed) argument 1522, and the result "7" is passed by means of the "|" symbol.

In an alternative embodiment, the executable function 1511 of the command 1510 is a C function, e.g. in the C++ language, the command 1510 is the name of the C function, and the result 1531 is a character string. For example, char *rc;

rc = echo("7");

tune("B", rc);

is a C code, where char is a statement defining the variable rc, the result 1531. Here echo is an executable function 1511 that uses the fixed argument 1521 to produce the result rc. In turn, "tune" is an executable function 1512 that uses the fixed argument "B" 1522 and the variable argument rc 1522 passed from the "echo" statement.

Figure 16:
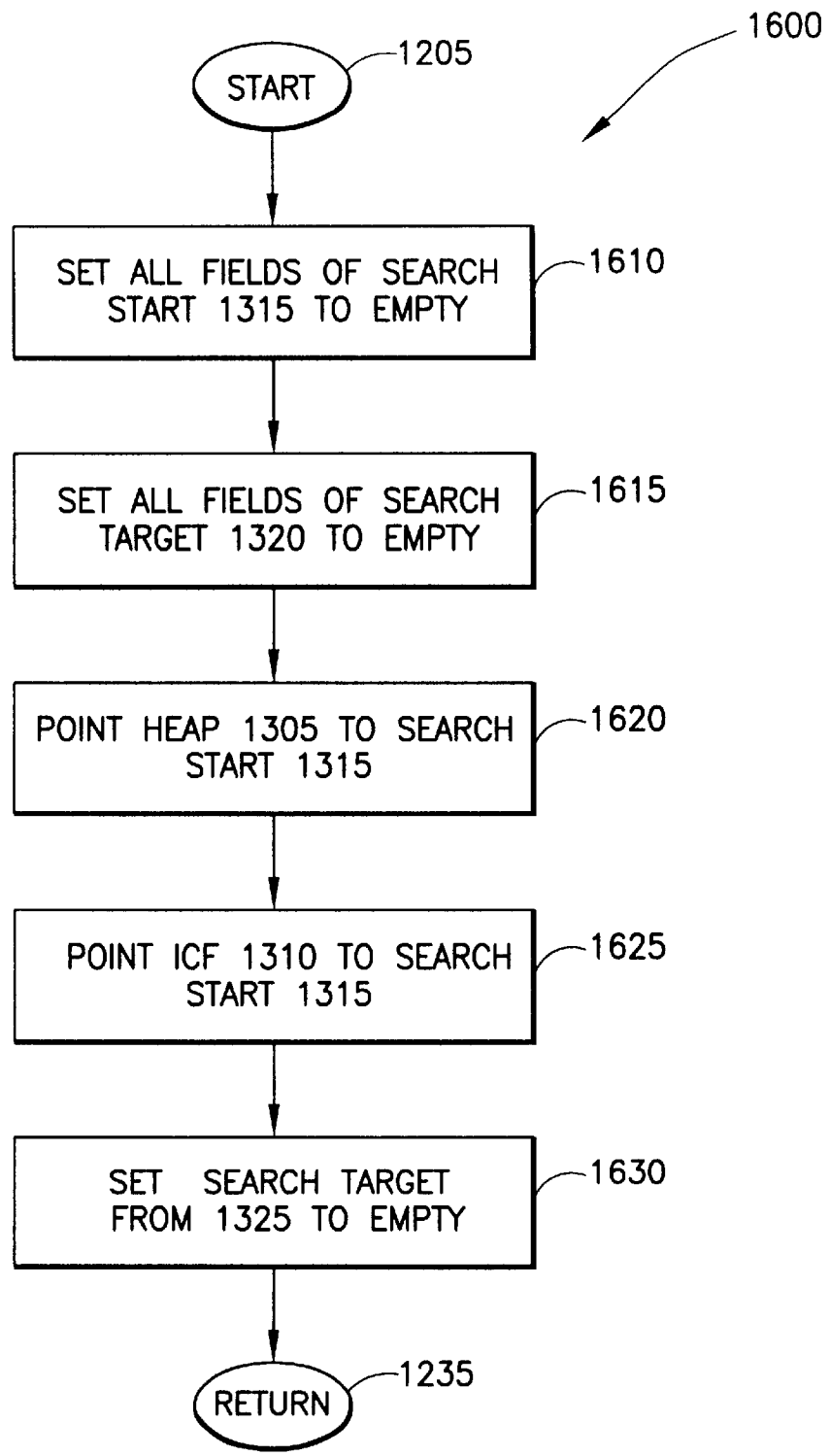
FIG. 16 is a flow chart showing the steps of initializing global variables before a connection is established.

FIG. 16 is a flow chart showing the steps of initializing global variables before a connection is established. In this process 1600, all fields in the Search Start record 1315 are set 1610 to null or empty, all fields in the Search Target record 1320 are set 1615 to null or empty, the Heap pointer 1305 is initialized to point to the address of search start 1315, the lcf pointer 1310 is initialized also to the address of search start 1315, and the Search Target From 1325 is set to null or empty. This process 1600 initialized the variables that are used to define the path from the connected source to the connected sink.

Figure 17:
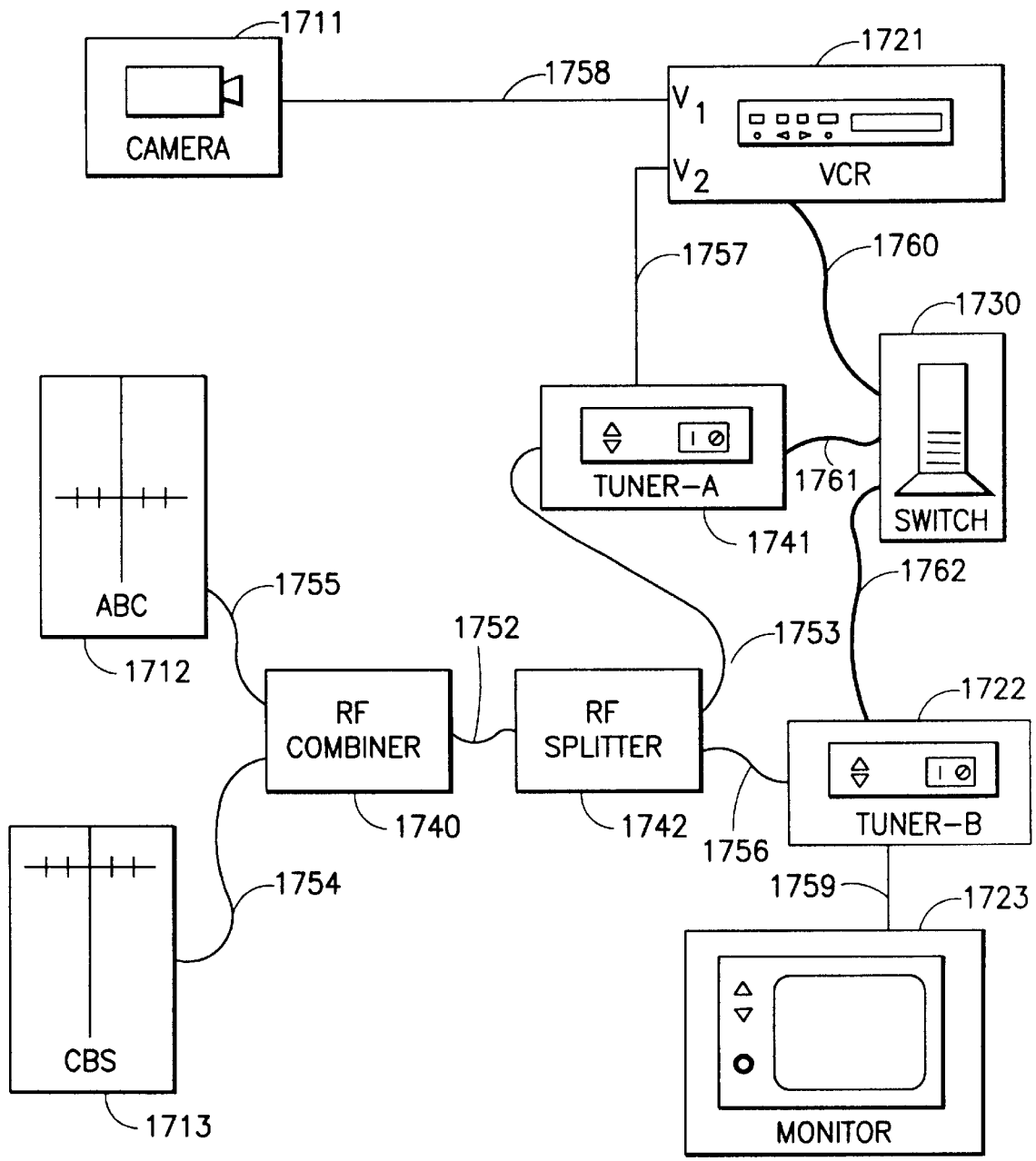
FIG. 17 is a wiring diagram used as an non limiting example of source, sink, and network devices being connected by the present invention.

FIG. 17 is a wiring diagram used as an non limiting example of source, sink, and network devices being connected by the present invention. Blocks 1711, 1712, and 1713 show example sources 110 representing a camera, the television station ABC, and the television station CBS, respectively. The camera 1711 sends its audio and video signals over a baseband coaxial cable 1758 into a Video Cassette Recorder (VCR) 1721, which is a sink 120. The VCR 1721 is capable of selecting to receive audio and video from either baseband inputs V1 or V2. ABC 1712 transmits its signal onto a broadband coaxial cable 1755. CBS 1713 transmits its signal also onto a broadband coaxial cable 1754.

The signals on the coaxial cables 1754 and 1755 are combined through RF combiner 1740. The combined signal is fed over a broadbase coaxial cable 1752 into an RF splitter 1742. The RF splitter 1742 sends its broadband input into both Tuner-A 1741 and Tuner-B 1722, over coaxial cables 1753 and 1756, respectively. Tuner-A 1741 is a television tuner (demodulator) which is capable of selecting a broadband television channel and converting its signal into baseband. The baseband signal of 1741 is sent over a baseband coaxial cable 1757 into input V2 of the VCR 1721. Tuner-B 1722 is also a television tuner which sends its baseband signal over a baseband coaxial cable 1759 into a television monitor 1723.

Tuner-A 1741, Tuner-B 1722, and the VCR 1721, are all capable of operating under computer control, through computer data lines 1761, 1722, and 1760, respectively. The switch 1730 is a computer which can control these devices.

FIG. 18 is a block diagram of an non limiting example table set used in the example system described in FIG. 10. This figure is a copy of the Source/Sink Table 200 showing the fields defined in FIGS. 2 and 3 above. These fields are numbered as in FIGS. 2 and 3, and the descriptions of these fields is given above. For the FIG. 10 example, there will be five Source/Sink records named (in the Source/Sink Record Name field): Camera, ABC, CBS, VCR, and Tuner B, the network devices on the path between the connected source ABC and the connected sink Tuner B. Since Camera does not connect to any network devices (only the sink, VCR, is connected) there are no entries in the Source To field 230 for the Camera Source/Sink record. However, since ABC is connected to the combiner network device 1040, its Source To field 230 contains "Combiner" in the Source To Name field 360, ECHO in the Source To Command field 365, and "7" in the Source To Argument field 370.

Since CBS is connected to the combiner network device 1040, its Source To field 230 contains "Combiner" in the Source To Name field 360, ECHO in the Source To Command field 365, and "2" in the Source To Argument field 370.

Since VCR is a sink connected to the tuner network device 1041, its Source From field 250 contains "Tuner A" in the Source From Name field 310, SELECT VIDEO in the Source From Command field 315, and "2" in the Source From Argument field 320. Further, VCR is sink connected to the Camera 1011. Therefore, an additional Source From field 250 contains "Camera" in the Source From Name field 310, SELECT VIDEO in the Source From Command field 315, and "1" in the Source From Argument field 320.

Since Tuner B 1022 is a sink connected to the combiner network device 1040, its Source From field 250 contains "Combiner" in the Source From Name field 310, TUNE in the Source From Command field 315, and "B" in the Source From Argument field 320.

Figure 19:
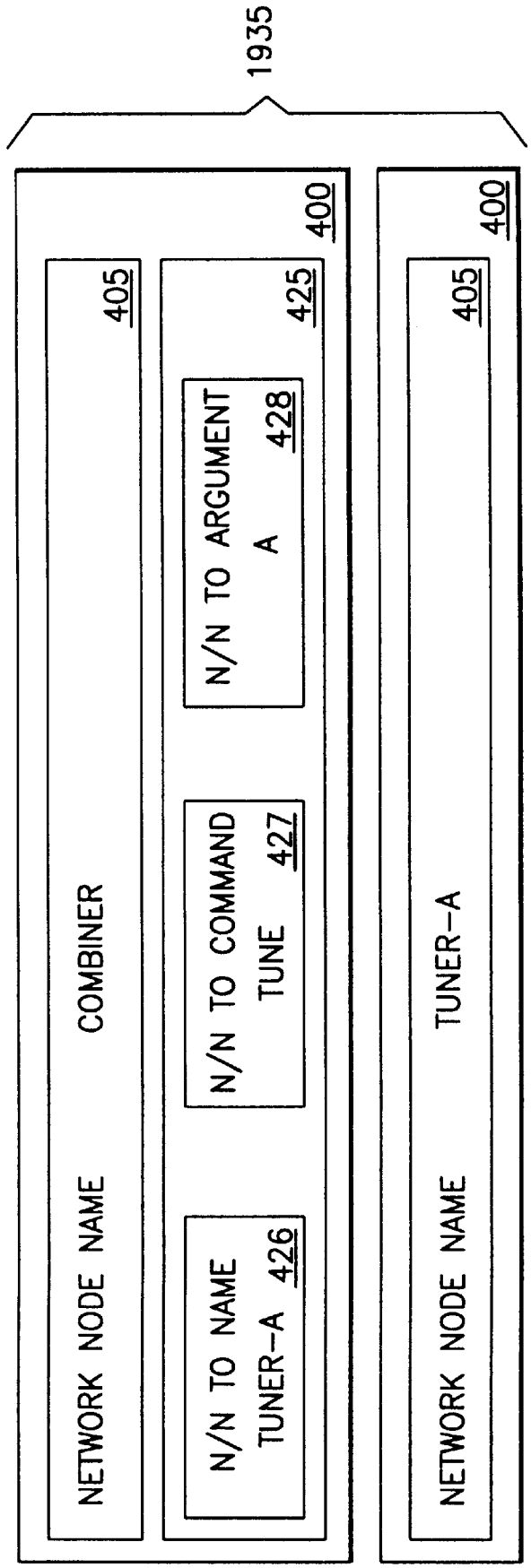
FIG. 19 is a non limiting example block diagram of the network node set used in the system described in FIG. 10.

FIG. 19 is a block diagram of the network node set 435 used in the example network in FIG. 10. This figure is a copy of the network Node Set 435 showing the fields defined in FIG. 4 above. These fields are numbered as in FIGS. 4, and the descriptions of these fields is given above. For the FIG. 10 example, there are two network nodes 400 within the Network Node Set 1935 (435). These nodes represent the combiner network device 1040 and the tuner A network device 1041. Since the combiner is connected to Tuner A, it has Tuner A in its Network Node To Name field 426, TUNE in its Network Node To Command field 427, and "A" in its Network Node To Argument field 428. Since the Tuner A does not send a signal to another network device, it has no Network Node To 425 entries.

Given this disclosure, one skilled in the art can develop equivalent embodiments of this invention that are also within the contemplation of the inventors.

We claim:

1. A switch controller, having one or more central processing units (CPUs) for causing a switch to connect and disconnect one or more signal source devices to one or more signal sink devices through a network of network devices, the switch controller comprising:

a. a routing process, executed by one or more of the CPUs, that determines a path that is selected from a plurality of possible paths through the network, the path between the signal source device and the signal sink device, the path defining one or more network devices between the signal source device and the signal sink device, and the path having a directional edge between each network device from a first network device to a second network device, the path further having one or more commands associated with each edge, and each of the commands defining an operation to be performed by the second network device; and b. a connection process, executed by one or more of the CPUs, that, after the path is selected, performs each command along the path to so that each second network device operates to form a connection between the signal source device and the signal sink device.

2. A switch controller for connecting and disconnecting devices in a network of devices, the devices including one or more signal source devices, one or more signal sink devices and one or more network devices, a connected signal source device being one of the signal source devices and the connected sink device being one of the signal sink devices, the switch controller comprising:

a computer with one or more central processing unit, one or more memories, and a communication link that connects one or more outputs of the computer to one or more of the network devices;

a directed graph, stored in one or more of the memories, having two or more nodes and one or more directional edges connecting one or more pairs of the nodes, each pair representing devices that are a From Device and a To Device, and each of the edges representing a connection directed from the From Device to the To Device, one or more commands being associated with each edge, each of the commands defining an operation to be performed by the To Device to establish a connection between the From Device and the To Device;

a routing process, executed by one or more of the central processing units, that searches the directed graph to find the nodes associated with both the connected source and the connected sink, the routing process determining a path between the connected source and the connected sink, the path containing one or more of the edges; and a connection process, executed by one or more of the central processing units, that traverses the path and performs each command associated with each of the edges along the path so that the respective To Devices operate to form a connection between the connected source and the connected sink.

3. A switch controller, as in claim 2, where the operation defined by one of the commands includes any one of the following: making a connection, making a disconnection, tuning to a frequency, modulating to a frequency, pointing an antenna, panning and zooming a camera, loading and playing from a stored media, stopping play from a stored media, recording to a stored media, stopping the recording to a stored media.

4. A switch controller, as in claim 2, where the path is determined by using any one of the following methods: Dijkstra, Floyd, and Melhorn.

5. A switch controller, as in claim 2, where one or more of the edges has a cost.

6. A switch controller, as in claim 5, where the cost includes any one of the following measures of: a signal strength, a signal quality, a signal bandwidth, and a monetary cost of equipment use.

7. A switch controller, as in claim 2, where the signal source devices include any one of the following: a television station, a satellite communication link, a video cassette recorder, a laser disc play, a microphone, a media streamer, a telephone, a camera, and a computer.

8. A switch controller, as in claim 2, where the signal sink devices include any one of the following: a television station, a video cassette recorder, a television monitor, a computer, a media streamer.

9. A switch controller, as in claim 2, where the network devices include any one of the following: a crosspoint switch, a radio frequency cross point switch, a radio frequency converter, an optical converter, a radio frequency combiner, a radio frequency splitter, a fiber optics link, a radio frequency link, a modulator, a demodulator, a base band video link, a telephone, a computer network server, and a computer network router, and a computer.

10. A switch controller as in claim 2, used to establish an Asynchronous Transfer Mode (ATM) connection.

11. A switch controller as in claim 10, where the signal source and the signal sink devices are an ATM edge node and the network devices are one or more ATM switches.

12. A switch controller, as in claim 11, where a bandwidth cost is optimized when the connection is made.

13. A switch controller, as in claim 2, where the path is traversed in a direction from the connected source to the connected sink.

14. A switch controller, as in claim 2, where the path is traversed in a direction from the connected sink to the connected source.

15. A switch controller, having one or more memories and one or more central processing units (CPUs), for causing a switch to connect and disconnect one or more signal source devices to one or more signal sink devices through a network of network devices, the switch controller comprising:

a Sink From record, stored in one or more of the memories, associated with the connected sink, the Sink From record having a Sink From Name and a Sink From Command, the Sink From Name being associated with a path network device, the path network device being one of the network devices on a path from the connected source the connected sink, the connected source the Sink From Command being a connection operation performed by the path network device; and a connection process, executed by one or more of the central processing units, that causes the path network device to perform the connection operation to create a connection between the path network device and the connected sink along the path.

16. A switch controller for connecting and disconnecting devices in a network of devices, the devices including one or more signal source devices, one or more signal sink devices and one or more network devices, a connected signal source device being one of the signal source devices and the connected sink device being one of the signal sink devices, the switch controller comprising:

a computer with one or more central processing units, one or more memories, and a communication link that connects one or more outputs of the computer one or more of the network devices;

a table set of one or more Source/Sink tables resident in one or more of the memories, each of the Source/Sink tables having a Source/Sink Table Name and zero or more Source/Sink Records, each of the Source/Sink records having a Source/Sink Record Name, zero or more Sink From fields and zero or more Source To fields, each of the Sink From fields having a Sink From Name and a Sink From Command, each of the Source To fields having a Source To Name and a Source To Command, each of the Source/Sink Records defining one or more directional edges associated with any one of a signal source and signal sink device identified in the Source/Sink Record Name, zero or more of the directional edges each identified in one of the Sink To fields being connections leaving the Source/Sink device and zero or more of the direction edges each identified in one of the Sink From fields being connections entering the Source/Sink device;

a node set of one or more network node tables resident in one or more of the memories, each of the network node tables having a network Node Name and zero or more network Node To fields, each of the network Node To fields having a network Node To Name field and a network Node To Command field, a directional network edge being defined from the network device identified in the network Node Name field to the network device identified in the network Node To Name field, each of the network Node To Command fields having one or more commands associated with the respective network edge, and each of the commands defining an operation to be performed by the device identified in the network Node To field;

a routing process, executed by one or more of the central processing units, that searches the table set until the Source/Sink record associated with both the connected source and the connected sink are found, the routing process determining a path between the connected source and the connected sink, the path including one or more of the directional edges and one or more of the network edges; and a connection process, executed by one or more of the central processing units, that traverses the path and performs each command associated with each of the directional edges and network edges along the path so that the respective devices device operates to form a connection between the connected source and the connected sink.

17. A switch controller, as in claim 16, where one or more of the Sink Prom fields is changed to change one of the connections to one of the signal sink devices.

18. A switch controller as in claim 17, where the change is any one of the following: adding a connection to a signal sink device and deleting a connection from a signal sink device.

19. A switch controller, as in claim 16, where one or more of the Source To fields is changed to change one of the connections to one of the signal source devices.

20. A switch controller, as in claim 19, where the change is any one of the following: adding a connection to one of the signal source device and deleting a connection from one of the signal source devices.

21. A switch controller, as in claim 16, where one or more of the network Node To fields is changed to change one of the connections to one of the network devices.

22. A switch controller, as in claim 21, where the change is any one of the following: adding a connection to one of the network device and deleting a connection from one of the network devices.

23. A switch controller, as in claim 16, where one or more of the Source/Sink Records is changed to change any one of the signal source devices and signal sink devices.

24. A switch controller, as in claim 23, where the change is any one of the following: adding one of the signal source devices, adding one of the signal sink devices, deleting one of the signal source devices, and deleting one of the signal sink devices.

25. A switch controller, as in claim 16, where one or more of the network Node Names is changed to change any one of the network devices.

26. A switch controller, as in claim 25, where the change is any one of the following: adding one of the network devices and deleting one of the network devices.

27. A method for determining a connection path through a network of devices, the connection path being from a connected source, through one or more network devices, to a connected sink, the method comprising the steps of:

a. representing the network with a directed graph with two or more nodes and one or more edges, with each device represented as a node of the directed graph and each of one or more connections between devices in the network represented by one of the edges;

b. initializing a heap list of one or more nodes to have only the connected source node, the source node being a frontier node;

c. if the current node does not have an edge pointing to the sink node, performing the following steps:

c1. if the connected sink node is not the frontier node in the heap list, adding an added entry to the end of the heap list all To Nodes that the frontier node is connected to by an frontier edge pointing away from the frontier node, and recording a link in the respective added entry that the frontier node is connected to the To Node;

c2. changing the frontier to a next node in the heap list;

c3. repeating this step c;

d. starting from the connected sink to the connected source, traversing the heap list by reversing the links at each node to determine a path from the connected source to the connected sink.

28. A method, as in claim 27, having the further step of traversing the path to execute one or more commands associated with each edge of the path, in order to establish a connection from the connected source to the connected sink.

29. A method, as in claim 28, where each link also has an associated cost, and the added entries are added to head list and sorted by an order that is determined the cumulative cost of the cost to the frontier node from the source plus the cost of the frontier edge.

* * * * *